(12) United States Patent
Campos et al.

(10) Patent No.: US 11,109,238 B2
(45) Date of Patent: Aug. 31, 2021

(54) CAPACITY SHARING BETWEEN WIRELESS SYSTEMS

(71) Applicant: CABLE TELEVISION LABORATORIES, INC., Louisville, CO (US)

(72) Inventors: Luis Alberto Campos, Superior, CO (US); Bernard McKibben, Broomfield, CO (US); Jennifer Andreoli-Fang, Boulder, CO (US); Joey Padden, Boulder, CO (US); Justin Colwell, Louisville, CO (US); Ian MacMillan, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/393,761

(22) Filed: Apr. 24, 2019

(65) Prior Publication Data
US 2019/0253897 A1   Aug. 15, 2019

Related U.S. Application Data

(63) Continuation of application No. 14/267,273, filed on May 1, 2014, now abandoned.

(60) Provisional application No. 61/839,452, filed on Jun. 26, 2013.

(51) Int. Cl.
*H04W 16/14* (2009.01)
*H04W 24/02* (2009.01)
*H04W 36/08* (2009.01)

(52) U.S. Cl.
CPC .......... *H04W 16/14* (2013.01); *H04W 24/02* (2013.01); *H04W 36/08* (2013.01)

(58) Field of Classification Search
CPC .................................................. H04W 16/14
USPC ........................................................ 370/331
See application file for complete search history.

(56) References Cited

U.S. PATENT DOCUMENTS

| | | | |
|---|---|---|---|
| 7,050,813 B1 * | 5/2006 | Paiz | H04M 15/00 379/114.01 |
| 2001/0012280 A1 * | 8/2001 | Dent | H04J 13/00 370/335 |
| 2013/0083743 A1 * | 4/2013 | Koo | H04B 7/0456 370/329 |
| 2013/0090124 A1 * | 4/2013 | Panchai | H04L 5/0096 455/452.1 |
| 2013/0138826 A1 * | 5/2013 | Ling | H04B 1/707 709/230 |
| 2013/0210447 A1 * | 8/2013 | Moe | H04W 72/0486 455/453 |

(Continued)

*Primary Examiner* — Peter G Solinsky
(74) *Attorney, Agent, or Firm* — PdZ Patent Law, PLLC

(57) ABSTRACT

One wireless telecommunications system includes a Mobile Central Office (MCO) for capacity sharing via a master scheduling system. The MCO is communicatively coupled to a plurality of wireless base stations, each being operable to handle a session from a wireless device and to handoff the session to another wireless base station when the wireless device moves into a range of the other base station. Each of the wireless base stations is operable to convey capacity information to the master scheduling system through the MCO, and to acquire capacity from one or more wireless base stations of another MCO when directed by the master scheduling system.

11 Claims, 27 Drawing Sheets

(56) References Cited

U.S. PATENT DOCUMENTS

| | | | |
|---|---|---|---|
| 2013/0242907 A1* | 9/2013 | Kang | H04W 72/0413 370/329 |
| 2014/0003239 A1* | 1/2014 | Etemad | H04L 5/0048 370/235 |
| 2014/0045491 A1* | 2/2014 | Van Phan | H04W 84/005 455/426.1 |
| 2014/0050086 A1* | 2/2014 | Himayat | H04L 27/2613 370/230 |
| 2014/0057610 A1* | 2/2014 | Olincy | H04W 4/16 455/414.1 |
| 2014/0092765 A1* | 4/2014 | Agarwal | H04W 24/02 370/252 |
| 2014/0162659 A1* | 6/2014 | Aminaka | H04W 36/14 455/437 |
| 2014/0362840 A1* | 12/2014 | Wong | H04W 88/06 370/338 |
| 2014/0376483 A1* | 12/2014 | Hong | H04W 72/048 370/329 |
| 2015/0188681 A1* | 7/2015 | Li | H04W 72/12 370/252 |
| 2015/0373672 A1* | 12/2015 | Forssell | H04L 47/76 370/329 |
| 2015/0382264 A1* | 12/2015 | Cho | H04L 69/14 370/338 |
| 2016/0095046 A1* | 3/2016 | Tervonen | H04W 48/14 370/338 |

\* cited by examiner

TDD-LTE TDM with Non-Shared eNodeB – Static

TDD-LTE Semi-Static Time-Coordinated FDM with Non-Shared eNodeB

TDD-LTE Real-Time Time-Coordinated FDM with Non-Shared eNodeB

FDD-LTE TDM with Non-Shared eNodeB - Dynamic Time Allocation

FDD-LTE Dynamic FDM with Non-Shared eNode

FDD-LTE TDM Semi-Static Time Coordination with Non-Shared eNodeB
- Dynamic Time Allocation FDD-LTE TDM Real-Time Time Coordination FDM with Non-Shared eNodeB TDD-LTE Semi-Static Time-Coordinated FDM with Shared eNodeB Dual S1 with Dual PDCCH TDD-LTE Dynamic FDM with Shared eNodeB

CAPACITY SHARING BETWEEN WIRELESS SYSTEMS

CROSS REFERENCE TO RELATED APPLICATIONS

This patent application is a continuation of U.S. patent application Ser. No. 14/267,273, filed May 1, 2014, which application claims priority to, and thus the benefit of an earlier filing date from, U.S. Provisional Patent Application No. 61/839,452, filed Jun. 26, 2013, the entire contents of which are hereby incorporated by reference.

BACKGROUND

Cellular telephony continues to evolve at a rapid pace. Cellular telephone networks currently exist in a variety of forms and operate using a variety of modulations, signaling techniques, and protocols, such as those found in 3G and LTE networks (3rd Generation of mobile telecommunications technology and Long Term Evolution, respectively). As consumers require more capacity, the networks usually evolve. For example, some carriers, or Mobile Network Operators (MNOs), employ a combination of 3G and the faster LTE because, as demand for data and voice increased, the MNOs needed faster networks. But, a complete overhaul of the MNOs entire network from 3G to the faster LTE would not be practical or economical. And, the MNOs need to operate both networks until the slower network is eventually phased out.

And, the very different ways in which the networks operate further complicate network changes. For example, 3G networks would handle wireless communications through a base station by connecting the communications to a Public Switching Telephone Network (PSTN) through a Mobile Telephone Switching Office (MTSO) of the MNO. In LTE, however, wireless communications through base stations are typically handled through packet switching networks so a connection to the PSTN is not necessary in many cases. In either case, each network of a MNO includes some sort of Mobile Central Office that is operable to handle the communications between wireless devices (also known as user equipment) and base stations.

Still, even with these faster networks, the demand for more data appears to outpace MNO capabilities. And, the demand can change from day to day or even hour to hour. For example, when a location experiences a rapid increase in population, such as what occurs during sporting events, the MNOs capacity can be overwhelmed. And, when an MNO's capacity is overwhelmed, communications between user equipment and base stations get dropped.

SUMMARY

Systems and methods presented herein provide for capacity sharing between wireless systems via a master scheduling system. In one embodiment, a wireless telecommunications system includes a plurality of wireless base stations and a Mobile Central Office (MCO) communicatively coupled to each of the wireless base stations. Each wireless base station is operable to handle a session (i.e., a voice call, a data connection, a Voice Over Internet Protocol, etc.) from a wireless device (also known as user equipment) and to handoff the session to another of the wireless base stations when the wireless device moves into a range of the other wireless base station. Each of the wireless base stations is operable to convey capacity information to the master scheduling system through the MCO, and to acquire capacity from one or more wireless base stations of another MCO when directed by the master scheduling system.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
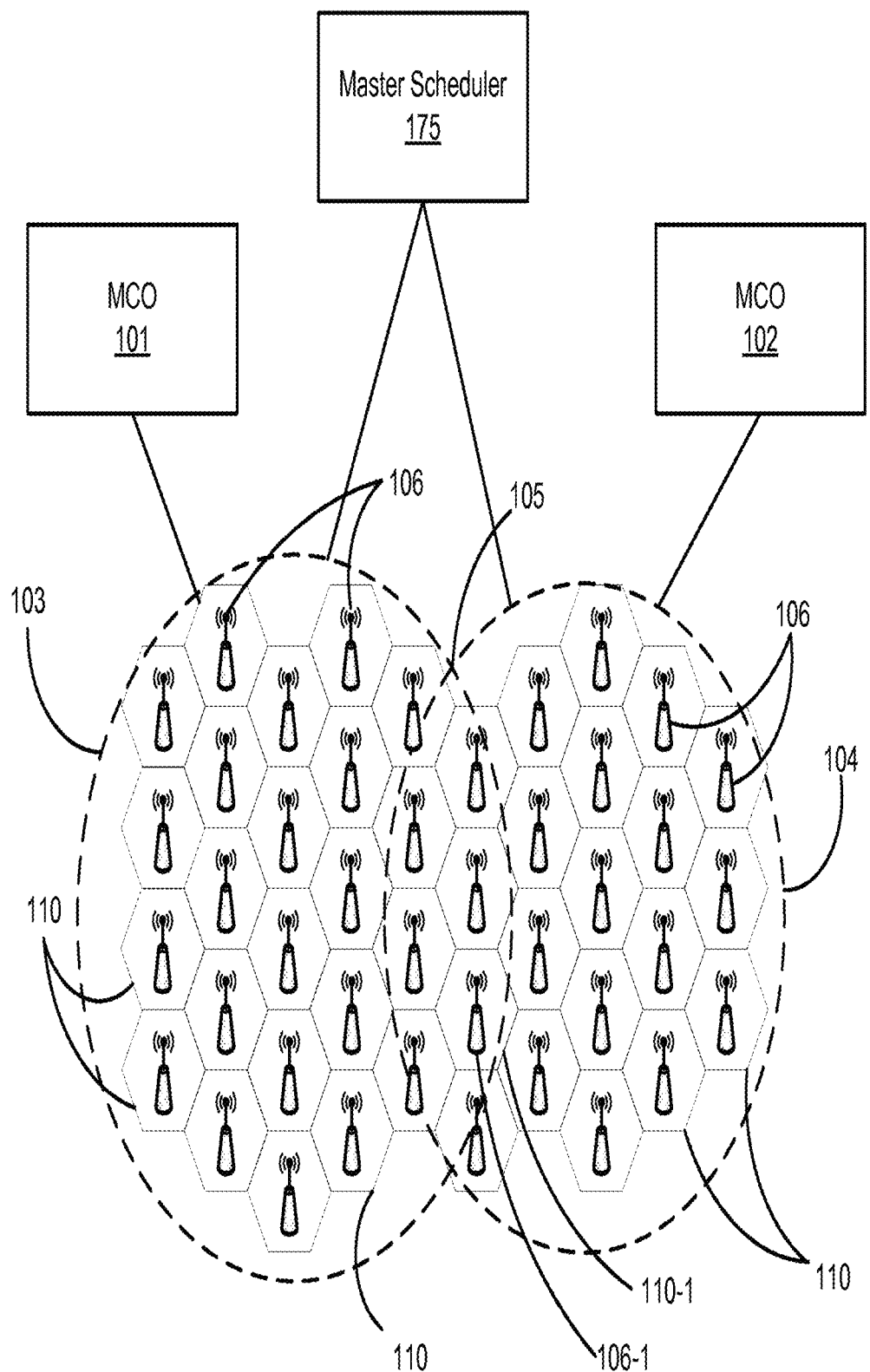
FIG. 1 is a block diagram of an exemplary wireless telecommunications system.

FIG. 1 is a block diagram of an exemplary wireless telecommunications system. In this embodiment, the system includes a first MCO 101 that is operable to handle communications between a set 103 of base stations 106 and user equipment operating within the range of the base stations 106. For example, the MCO 101 may be operated by a first mobile telecommunications carrier, or MNO. The set 103 may represent a particular market/geographical region in which the telecommunications carrier operates. Each base station is operable to cover a "cell" 110 of that geographical region. A wireless device (not shown), such as a mobile handset or other user equipment, may be in communication with a first of the base stations 106 and move to another location such that the wireless device is now in communication with a second of the base stations 106. The MCO 101 is operable to manage the communication of the wireless device from the first base station to the second base station. A second MCO 102 may operate in similar fashion with a set 104 of base stations 106. Alternatively, the MCO 102 may simply represent a wireless network or wireless entity. In any case, the MCO 102 represents an entity that is separate and distinct from the MCO 101.

Examples of the MCOs 101 and 102 include Mobile Telephone Switching Office (MTSOs) for mobile routing of data sessions and/or voice calls. An MTSO contains switching equipment for routing mobile phone calls from user equipment through the base stations. The MTSO interconnects calls from the user equipment with the landline telephone companies and other wireless carriers by connecting the calls to the Public Switched Telephone Network (PSTN). In many instances, the MTSO also conveys data from between user equipment and the internet via an over-the-air interface of the base stations and a connection to an internet backbone. The MTSO also provides resources needed to serve a mobile subscriber, such as registration, authentication, location updating and call routing. The MTSO may also compile billing information for subscribers via back office systems.

Other examples of the MCOs include packet switching, such as that found in LTE. In this case, data session services are provided to mobile devices. An IP Multimedia Core Network Subsystem (IMS) can also be used in LTE networks to couple user equipment to internet connections so as to convey both data and voice over the Internet, including Voice Over Internet Protocol (VOIP). Generally, though, LTE networks have equipment at base stations 106 that couple directly to the Internet. Thus, MCOs as used herein may represent such equipment.

Based on the forgoing, an MCO is any system, apparatus, software, or combination thereof operable to maintain or otherwise support wireless communications, including data and voice, with subscribers via user equipment (e.g., mobile handsets and other wireless devices). Accordingly, the MCO may be a wireless communications carrier or network employing, for example, 2G, 3G, LTE, WiFi, or any combination thereof. And, a base station 106 is any device or system operable to communicate with user equipment via Radio Frequency (RF).

As mentioned, the MCO 101 may be controlled and operated by a first mobile telecommunications carrier, or MNO. The second MCO 102, in this embodiment, is controlled and operated by a second telecommunications carrier or some other wireless network. In some instances, telecommunications carriers share antenna towers and/or have cells 110 that overlap within each other's geographic regions. An example of such is illustrated in the region 105 where the sets 103 and 104 intersect. For example, the base stations 106 within the region 105 may represent antenna towers that comprise antennas belonging to the MCO 101 and the MCO 102. Alternatively or additionally, the cells 110 within the region 105 may represent overlapping cells associated with the base stations 106. That is, a cell 110 within the region 105 may comprise a base station 106 belonging to the MCO 101 and a base station 106 belonging to the MCO 102.

In any case, an MCO may occasionally experience a need for increased capacity. For example, each base station 106 may be capable of handling communications for a certain number of users via their respective devices (i.e., user equipment). When a base station 106 is at its maximum capacity and another user initiates or continues a session with that base station 106, that breach of capacity can cause sessions to be dropped. At the very least, the maximum capacity prevents the other user from having a session with that base station 106 and the MCO. To overcome such problems, the MCO 101 is configured to request capacity from another wireless telecommunication system, such as the MCO 102.

Generally, when MCOs are owned, managed, or otherwise controlled by separate entities, the competitive nature of the environment prevents cooperation among the MCOs 101 and 102. However, the ability to share capacity among the MCOs 101 at 102 can be quite beneficial. For example, in emergency situations where one MCO happens to be over capacity with its subscribers and the other MCO operating in the same area is not, moving capacity from the other MCO would allow the over capacity MCO to establish communications for more of its subscribers and ensure that calls go. And, there are certainly commercial advantages to sharing capacity. For example, if capacity is not being used by one MCO, then that capacity could be offered to another MCO for commercial benefit.

As used herein, capacity may include RF spectrum, data throughput, backhaul capacity, network processing (e.g., virtualized Radio Area Networks, or "RANs", also known as Cloud RANs), channels in a Time Division Multiple Access (TDMA) signal, Code Division Multiple Access (CDMA) channels, channels in a Frequency Division Multiple Access (FDMA) signal, channels in the Orthogonal Frequency Division Multiplexing (OFMD), Carrier Sense Multiple Access (CSMA), and the like. Backhaul capacity may include, among other things, a backhaul portion of a network including intermediate links between a core network (or a backbone network) and smaller subnetworks at an edge of a hierarchical network. Backhaul capacity can also include an obligation to carry data packets to and from a global network, and the like.

To implement the capacity sharing concepts in this embodiment, the base stations 106 of the MCOs 101 and 102 are operable to communicate capacity information through their respective MCOs to a master scheduler 175 such that the master scheduler can request capacity from other wireless telecommunication systems. For example, the master scheduler 175 may monitor the capacity of the base stations 106 of each of the MCOs 101 and 102. When the master scheduler 175 detects that capacity may be exceeded by a base station 106 of the MCO 101, the master scheduler 175 may acquire excess capacity from a base station 106 of the MCO 102. In this regard, the master scheduler 175 may direct the base station 106 of the MCO 102 to relinquish that excess capacity and direct the base station 106 of the MCO 101 to acquire that excess capacity (or some other amount of capacity) to alleviate the need. After the need for additional capacity subsides, the base station 106 of the MCO 101 may relinquish the capacity to the master scheduler 175 through the MCO 101 such that the other base station 106 may reacquire it.

As used herein, the master scheduler 175 is any system, device, software, or combination thereof operable to interface and communicate with a plurality of MCOs to coordinate/manage capacity sharing among the MCOs. In this regard, the master scheduler 175 may be operable to interface using any of a variety of protocols and/or communication techniques available to the MCOs from which it requests capacity.

Figure 2:
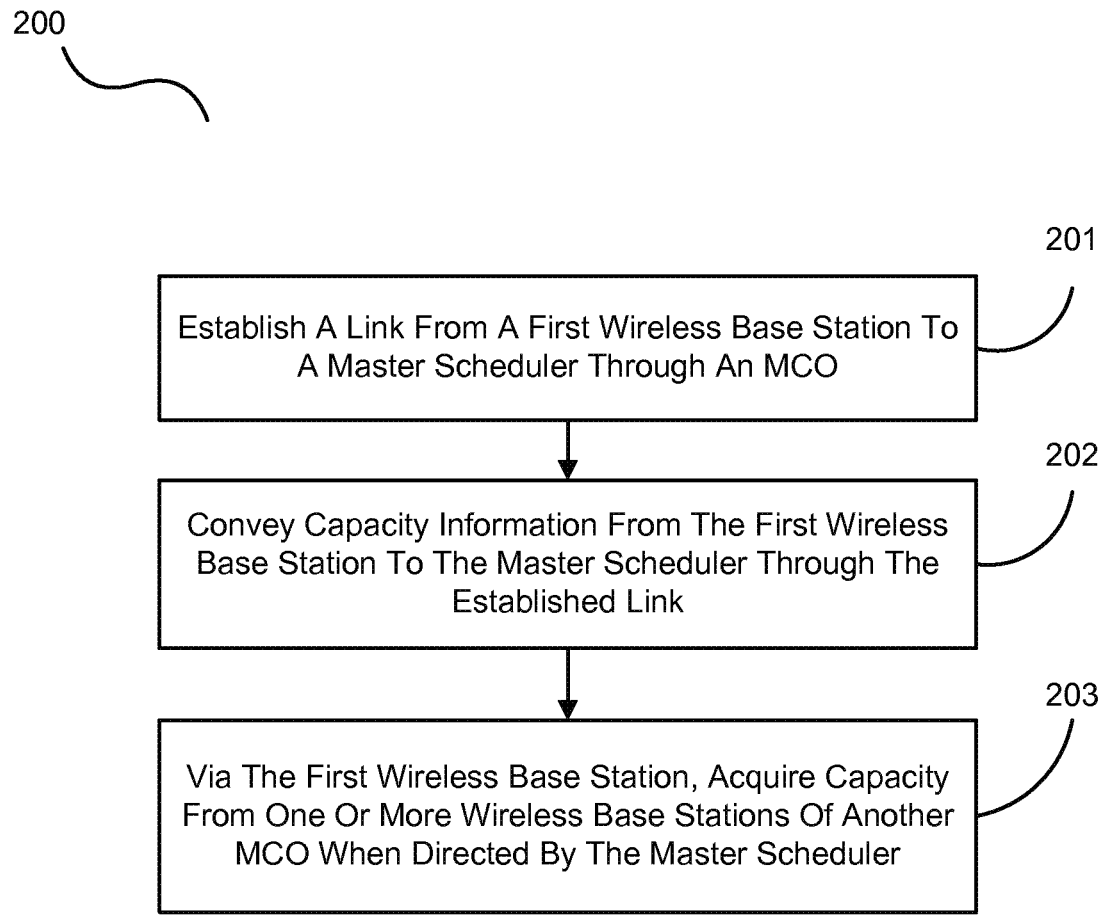
FIG. 2 is a flowchart illustrating an exemplary process of a wireless telecommunications system.

FIG. 2 is a flowchart illustrating an exemplary process 200 of a wireless telecommunications system. In this embodiment, a link is established from a first wireless base station 106 to the master scheduler 175 through its respective MCO, in the process element 201. For example, communication links between the base stations 106 of the MCO 101 may be established through the MCO 101 to the master scheduler 175. From there, the master scheduler 175 can monitor the capacity on each of the base stations 106 of the MCO 101. In this regard, the first base station 106 of the MCO 101 conveys capacity information to the master scheduler 175 through the MCO 101, in the process element 202.

When the master scheduler 175 detects a capacity issue on the first base station 106 of the MCO 101, the master scheduler 175 may acquire additional capacity from other wireless telecommunication systems including one or more the base stations 106 of the MCO 102. Once acquired, the master scheduler 175 directs the first wireless base station 106 to acquire the capacity, in the process element 203.

To illustrate, the base station 106-1 may have an antenna mounted on a tower and operable to handle communications from user equipment operating within the cell 110-1. When the base station 106-1 encounters another session with other user equipment that exceeds the capability of the base station 106-1, the master scheduler 175 detects the exceeded capability and requests capacity from a base station 106 of the MCO 102. The master scheduler 175 then directs the base station 106-1 to begin using the acquired capacity. Once finished, the base station 106-1 relinquishes the capacity to the master scheduler 175 such that the base station 106 of the MCO 102 can reacquire that capacity.

Again, to request and relinquish capacity, the master scheduler 175 may be configured to operate in a variety of communication protocols. For example, the MCO 101 may communicate to its base stations 106 via a particular protocol that differs from the protocol in which the MCO 102 communicates with its wireless base stations 106. Accordingly, the master scheduler 175 may be operable to communicate with each of their MCOs 101 and 102 via the respective communication protocols. Some non-limiting examples of various manners in which the user equipment may communicate through the acquired capacity are now shown in FIGS. 3A, 3B, and 4A-4C.

Example

Figure 3A:
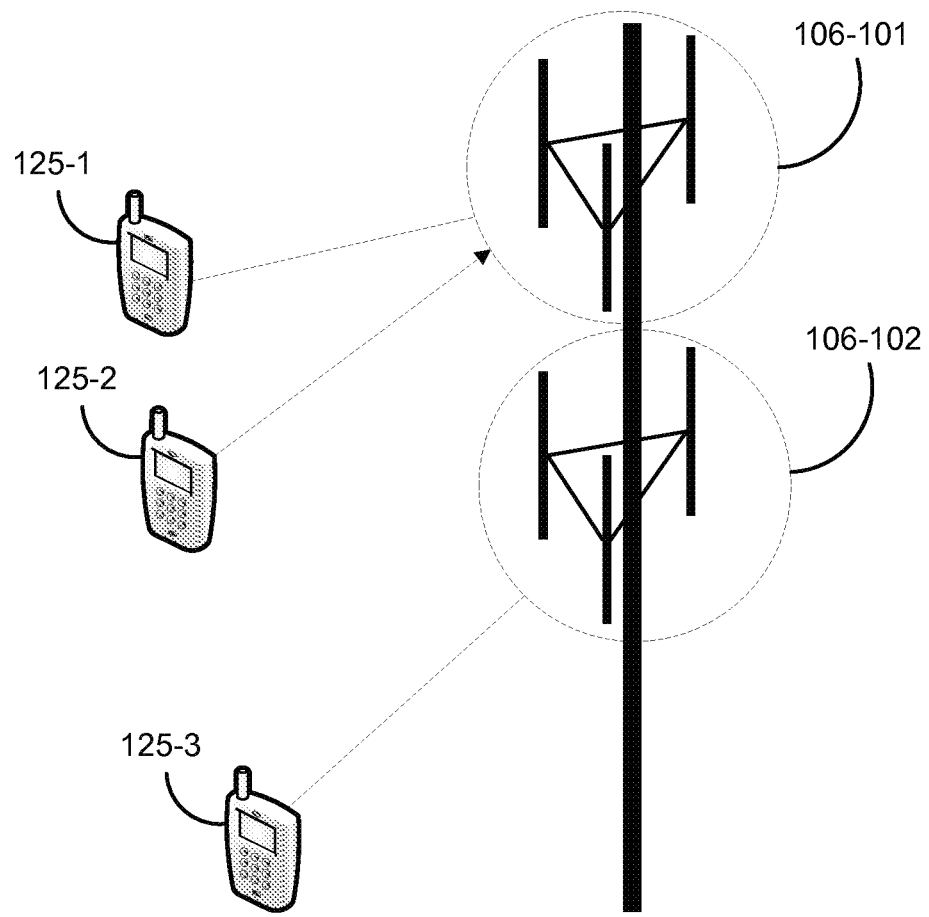
FIGS. 3A and 3B illustrate exemplary interactions between user equipment and base stations.
Figure 3B:
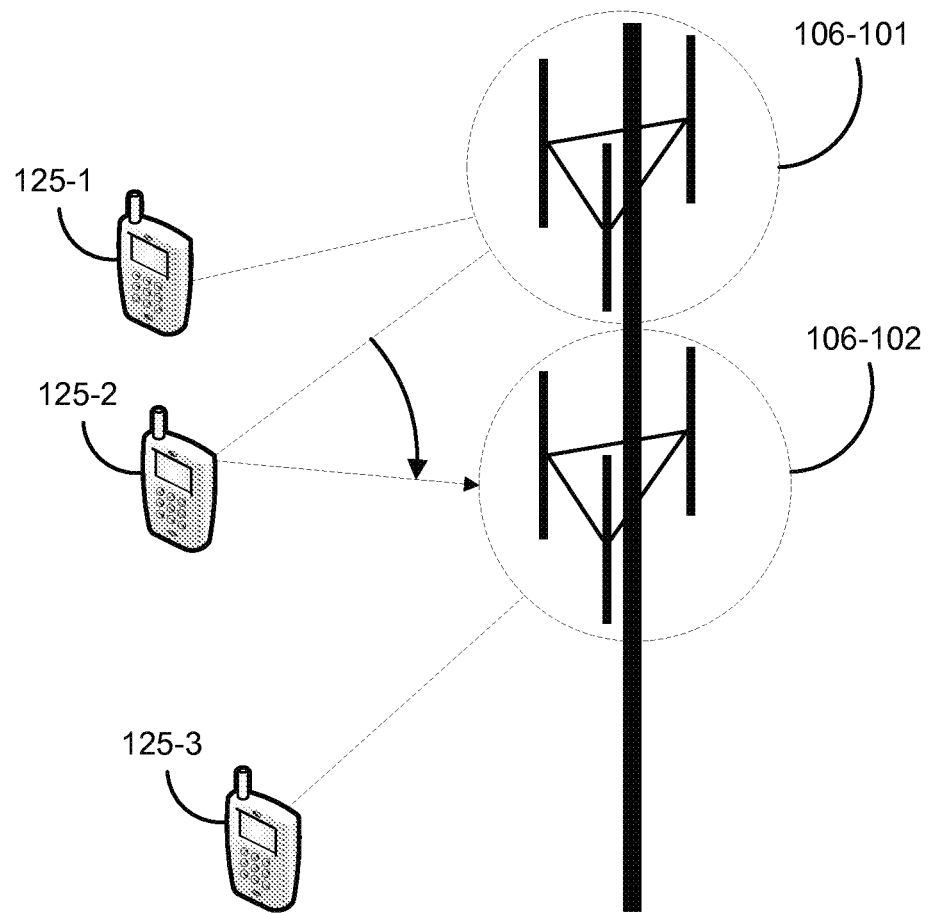

FIGS. 3A and 3B illustrate exemplary interactions between user equipment 125 and base stations 106. More specifically, FIGS. 3A and 3B illustrate two separate base stations 106-101 and 106-102 sharing the same antenna tower. The base station 106-101 is controlled by the MCO 101 and the base station 106-102 is controlled by the MCO 102. In FIG. 3A, the base station 106-101 has established a session and is communicating with the user equipment 125-1 and is currently at capacity. Another user equipment 125-2 then attempts to establish a session with the base station 106-101. The MCO 101 detects this situation and communicates with the MCO 102 to request an amount of excess capacity that the MCO 102 may have.

As can be seen in FIG. 3A, the base station 106-102 has a session established with the user equipment 125-3. However, the base station 106-102 still has capacity available for use by the base station 106-101. Thus, the base station 106-101, after requesting the excess capacity from the MCO 102, acquires the excess capacity by directing the user equipment 125-2 to establish a session with the base station 106-102, as illustrated in FIG. 3B.

Alternatively, the MCO 101, after negotiating with the MCO 102 for capacity, may simply acquire the capacity in the form of a frequency band that is allocated to the MCO 102. For example, the MCO 102 may have a license to a particular frequency band that differs from that of the MCO 101 so they won't interfere with one another on the same antenna tower. After the MCO 101 negotiates with the MCO 102 for additional capacity, the MCO 102 may simply relinquish that capacity and preclude, at least temporarily, its subscribers from using that frequency band. Thereafter, the MCO 101 may direct its subscribers to use the frequency band acquired from the MCO 102 by transmitting control messages to the user equipment of the subscribers that direct the user equipment to change frequency bands.

As discussed above, the capacity to be acquired may be any of a number of different types of communication technologies. For example, the acquired capacity may be a channel of the communication technology implemented by the MCO 102 through the base station 106-102. Thus, if the user equipment 125-2 is compatible, either the MCO 101 or the MCO 102 directs the user equipment 125-2 to establish a session with the base station 106-102. This may entail the user equipment 125-2 occupying a CDMA channel, an FDMA channel, a TDMA channel, an OFDM channel, etc. on the base station 106-102 depending on the communication technology being implemented on the base station 106-102.

Example

Figure 4A:
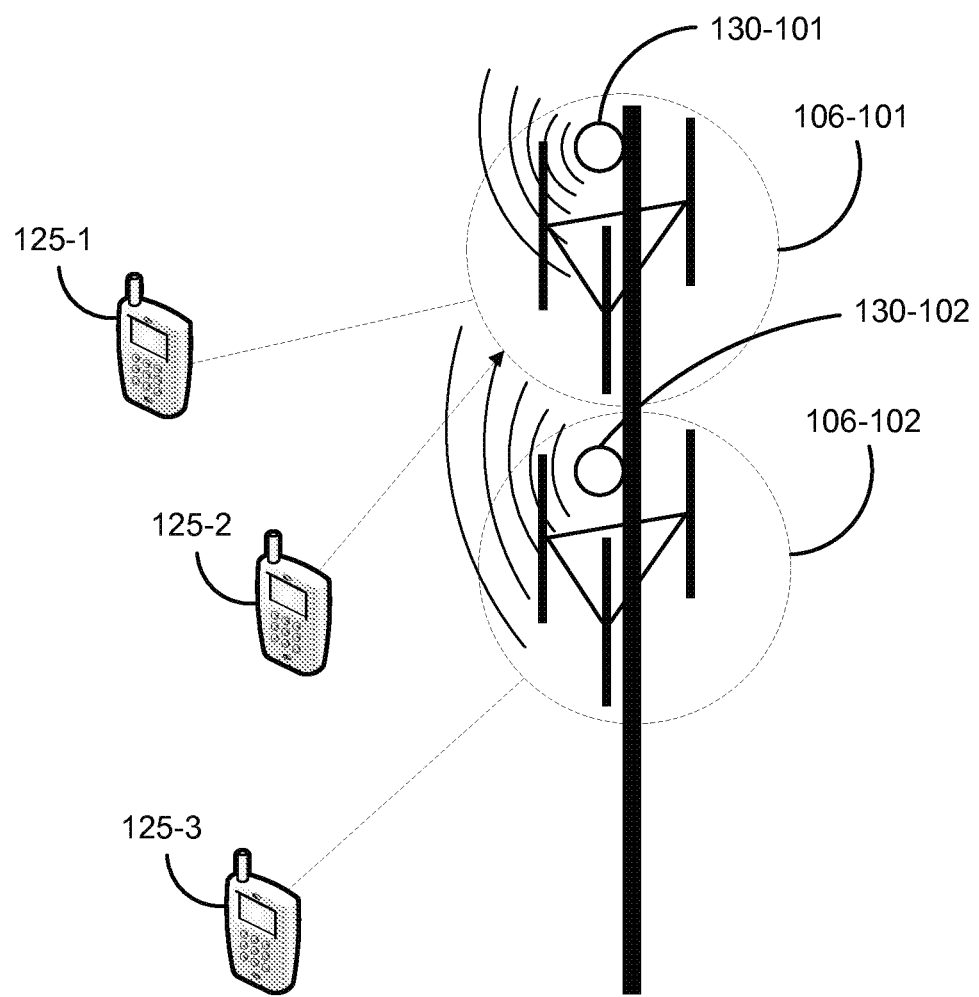
FIGS. 4A-4C illustrate exemplary interactions between user equipment and base stations configured with WiFi.
Figure 4B:
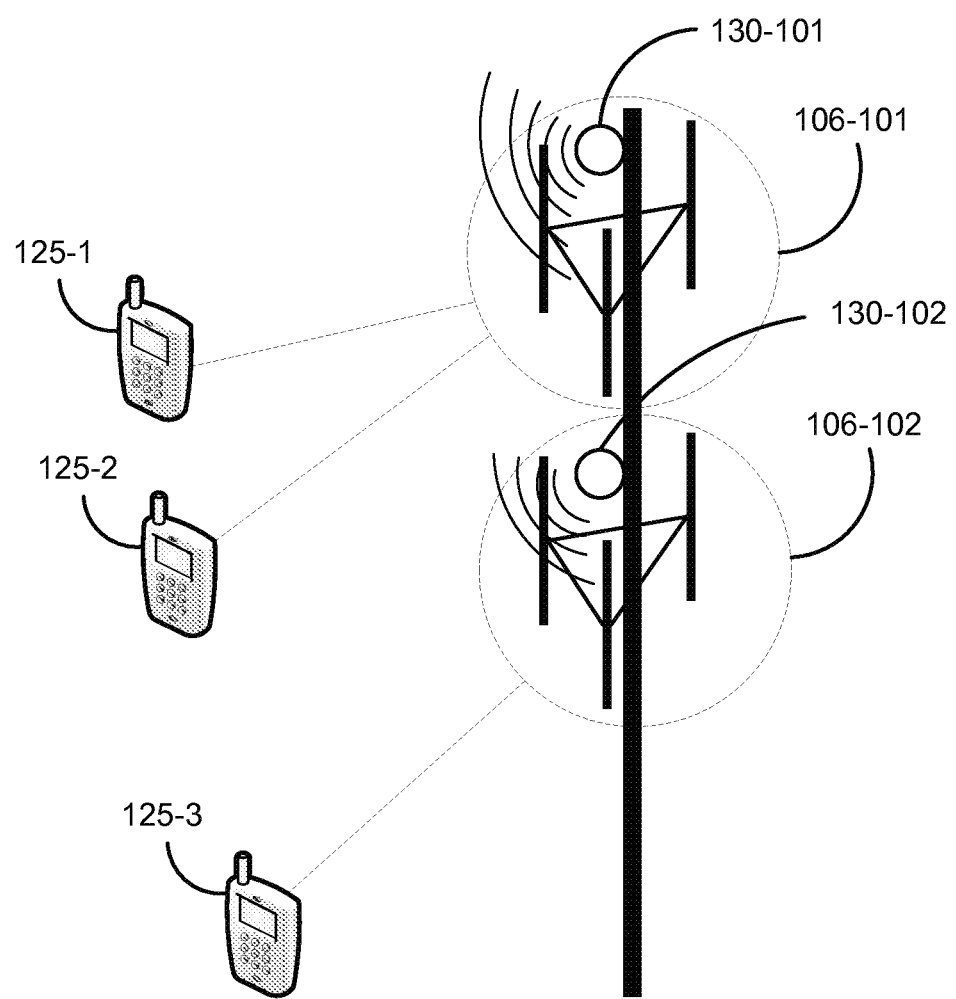
Figure 4C:
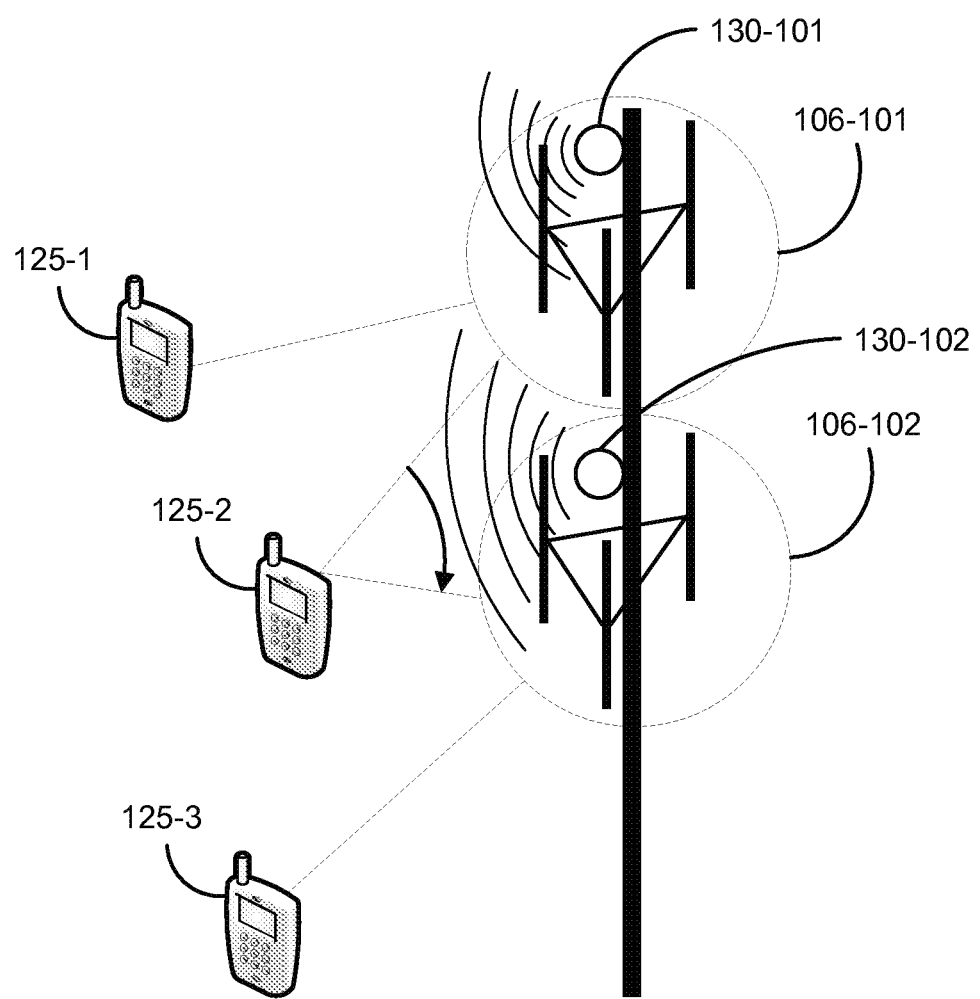

FIGS. 4A-4C illustrate exemplary interactions between user equipment 125 and base 106 stations configured with WiFi. In this embodiment, the base stations 106-101 and 106-102 are still configured on the same antenna tower. The base stations 106-101 and 106-102 are also configured with WiFi access points 130 that provide Internet access to the user equipment 125. Thus, the user equipment 125-1 and 125-2, being subscribers to the MCO 101, are operable to communicate data and/or voice via the WiFi access points 130-101 associated with the base station 106-101 and the MCO 101. Similarly, the user equipment 125-3 is operable to communicate data and/or voice via the WiFi access point 130-102 associated with the base station 106-102 and the MCO 102.

In FIG. 4A, the user equipment 125-2 is attempting to establish a session with the base station 106-101 by way of either of the WiFi access point 130-101 or through the cellular communications being employed by the base station 106-101. However, as the user equipment 125-2 attempts to establish a session with the base station 106-101 and/or the WiFi access point 130-101 (collectively the MCO 101), it is either being blocked by the signal from the WiFi access point 130-102 or the capacity for the base station 106-101 has reached its capacity. Thus, the MCO 101 may request additional capacity from the MCO 102 such that the user equipment 125-2 can establish a session.

In FIG. 4B, the capacity is acquired by a negotiation between the MCO 101 and the MCO 102 to direct the MCO 102 to decrease the signal strength of the WiFi access point 130-102 and/or change the direction of the WiFi signal. Thus, the user equipment 125-2 can establish a session with the MCO 101. Alternatively, as shown in FIG. 4C, the negotiation between the MCO 101 and the MCO 102 results in directing the user 125-2 to establish a session with the MCO 102 (e.g., via the WiFi access point 130-102 and/or the base station 106-102). Accordingly, those skilled in the art will readily recognize that the invention is not intended to be limited to any form of capacity sharing. And, it should be noted that the capacity may be dynamically shared among MCOs. For example, the MCOs via their local schedulers or other scheduling systems may automatically exchange capacity with one another based on need. Thus, if one MCO needs capacity, its scheduling system may automatically retrieve that capacity from another MCO (i.e., assuming it is a cooperative MCO) for as long as the capacity is needed or until the other MCO requires the capacity.

Figure 5:
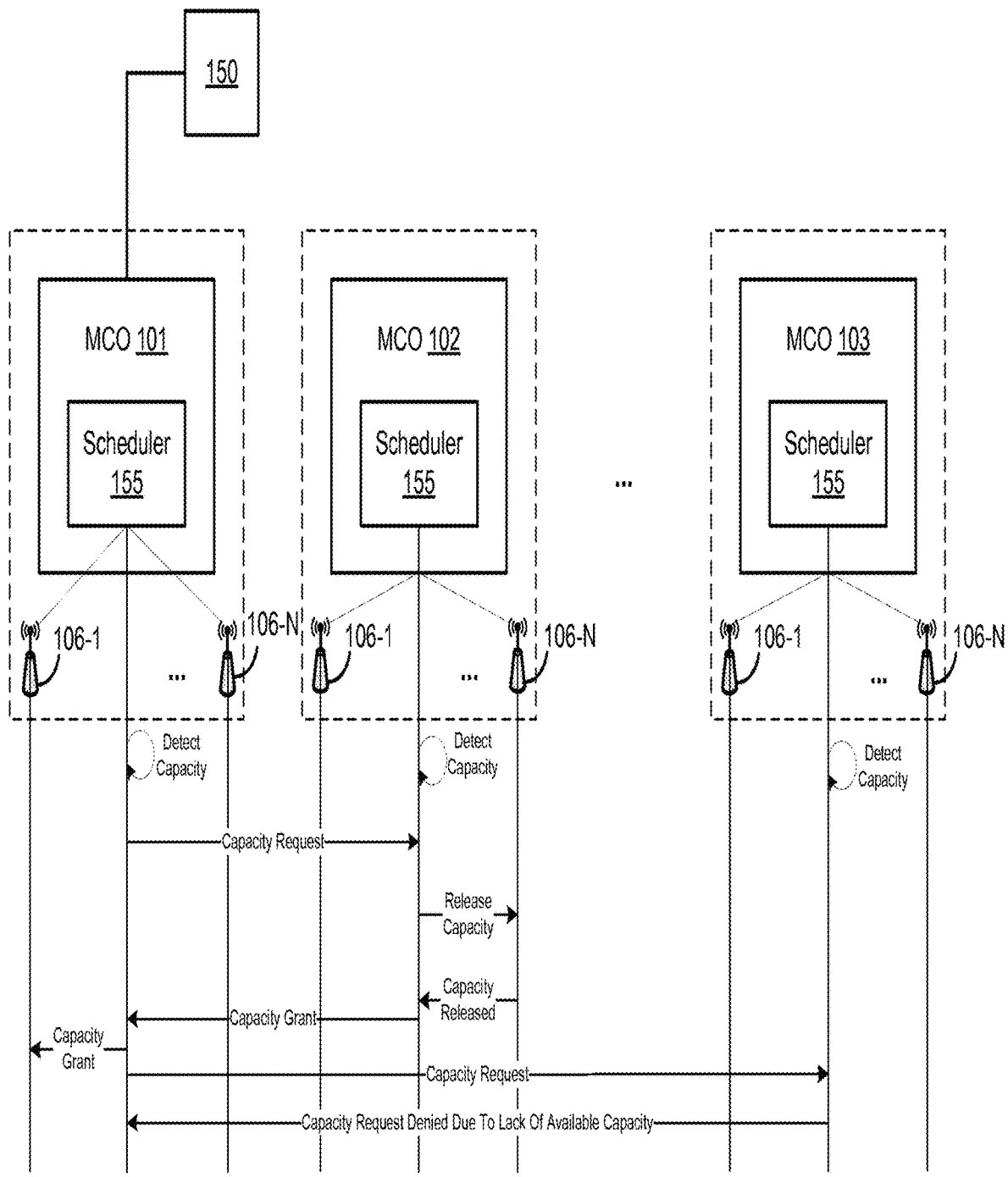
FIGS. 5-8 illustrate embodiments in which the MCOs coordinate to request capacity for subscribers.
Figure 6:
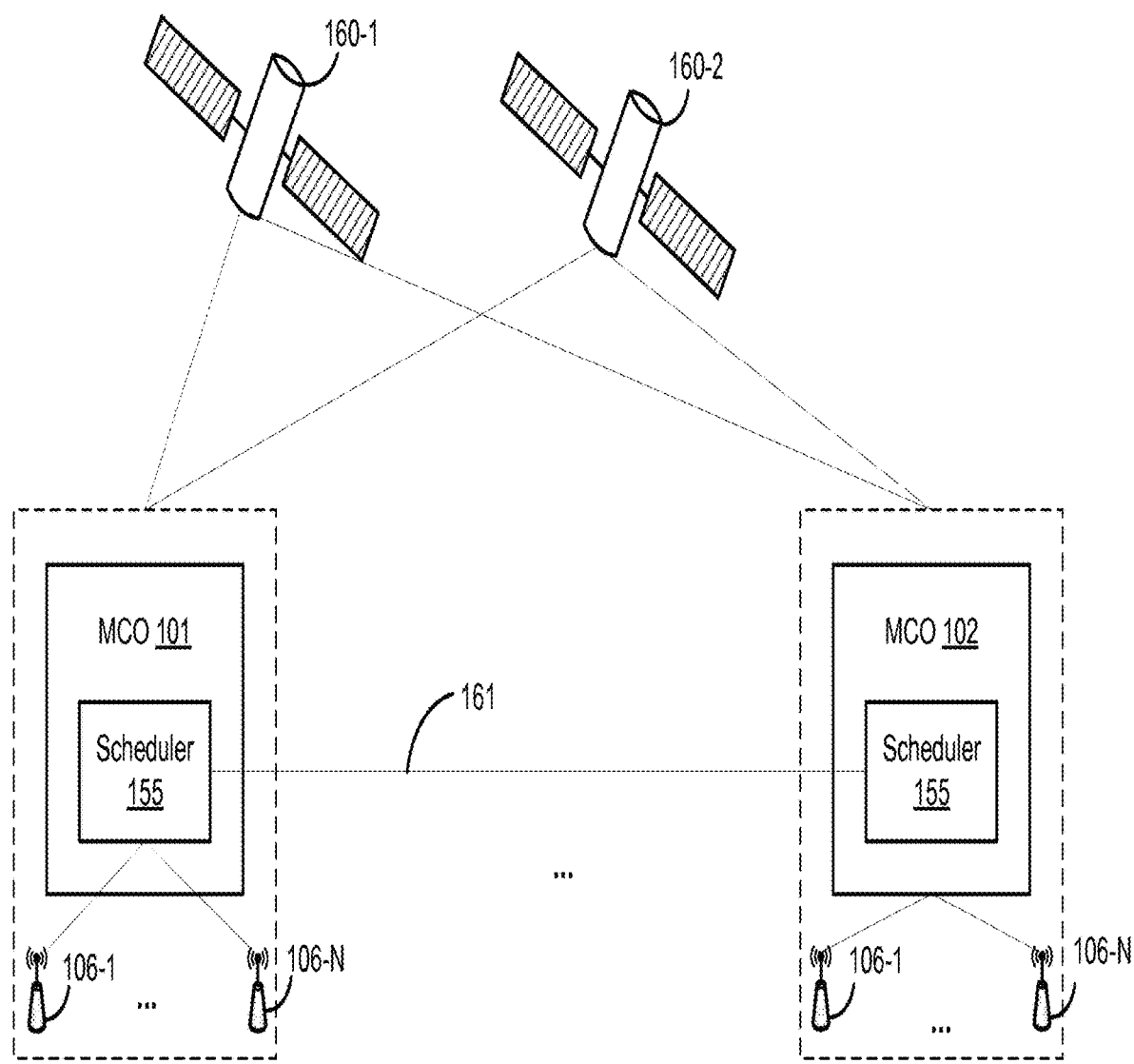
Figure 7:
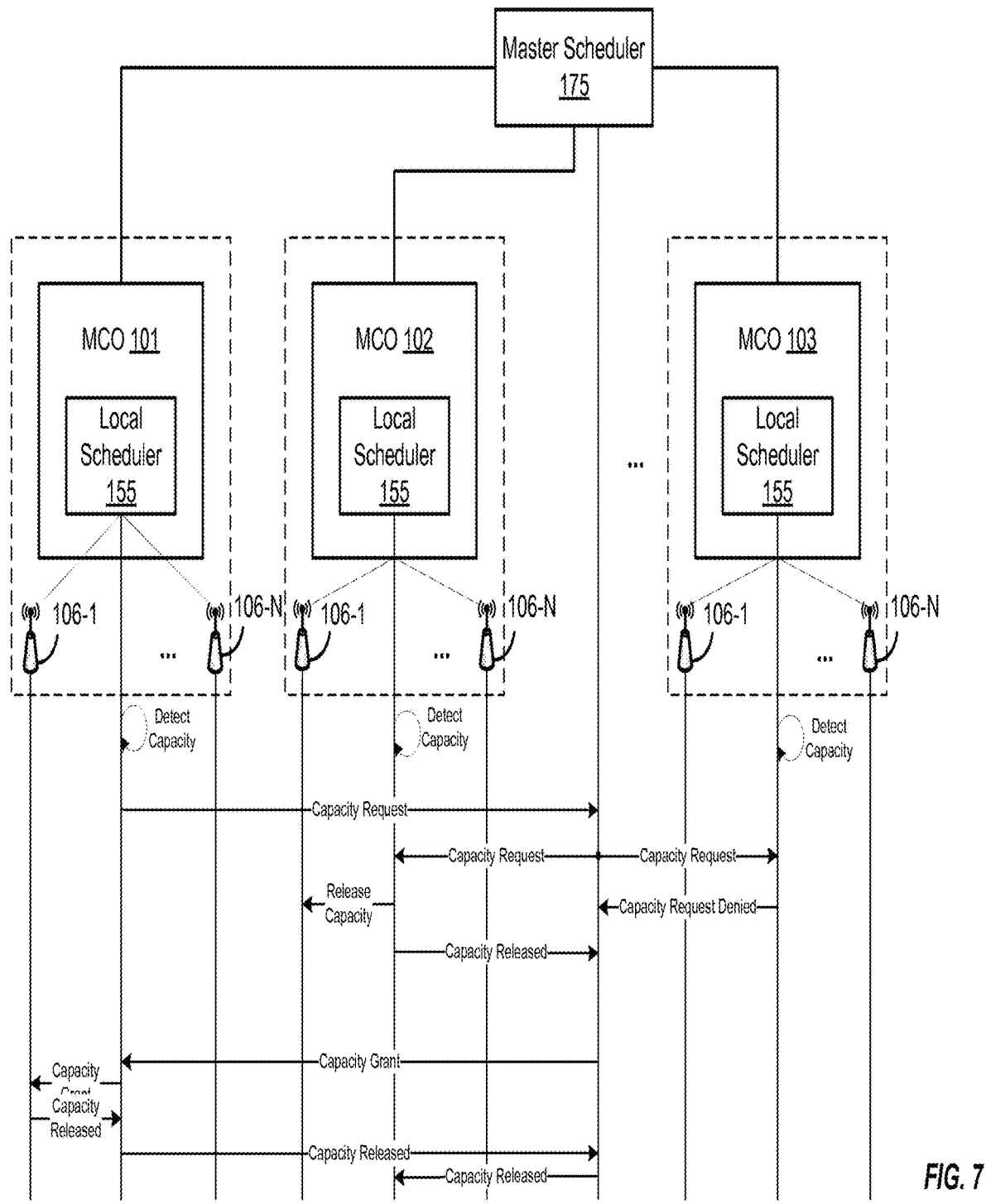
Figure 8:
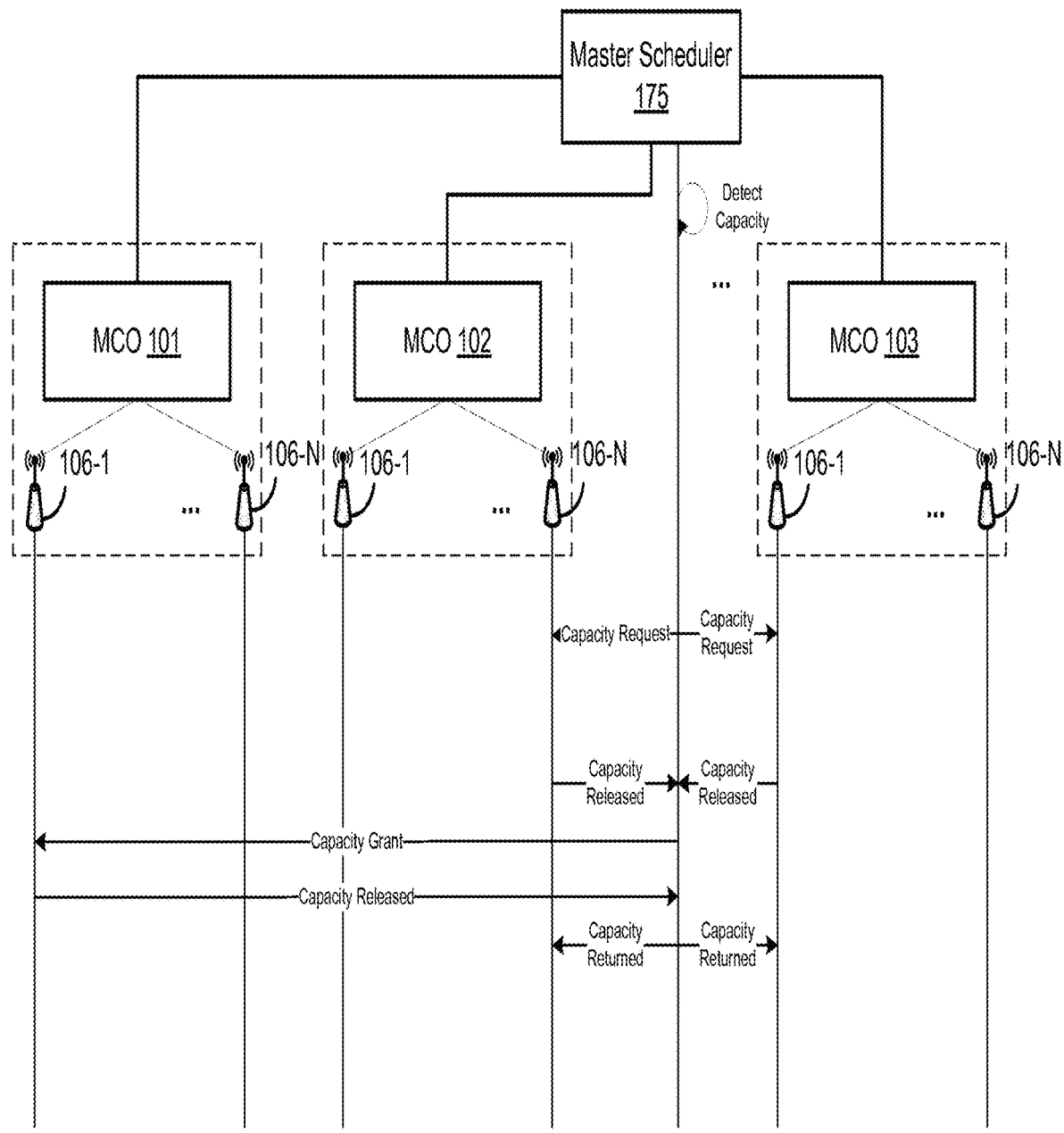

FIGS. 5-8 illustrate embodiments in which the MCOs coordinate to request capacity for subscribers. More specifically, FIG. 5 illustrates an MCO 101 with a local scheduler 155 operable to request additional capacity from other MCOs 102-103. FIG. 6 illustrates an exemplary coordination of capacity requests from an MCO 101 using satellites 160, such as GPS satellites, to provide timing for the capacity requests. FIG. 7 illustrates an exemplary master scheduler 175 that is operable to coordinate capacity requests with local schedulers 155 of MCOs 101-103 and to request capacity on their behalf. FIG. 8 illustrates an exemplary master scheduler 175 that is operable to detect capacity issues among MCOs 101-103 and request capacity on their behalf.

In FIG. 5, the MCO 101 is configured with a local scheduler 155 that is operable to detect capacities of its base stations 106. The MCOs 102 and 103 may be configured with similar local schedulers 155 that are operable to detect the capacities of their base stations 106. For example, each MCO may be configured with a plurality of base stations 106 to provide wireless services to its subscribers. In this regard, each MCO be associated with a different operating entity as discussed above. And, each scheduler 155 of the MCOs is operable to detect capacity of its various base stations 106 so as to request additional capacity from other MCOs when needed. Thus, a scheduler 155 is any system, device, software, or combination thereof operable to detect capacities of base stations 106 within its operating zone and request capacity from other MCOs and/or other wireless providers.

To illustrate, the scheduler 105 of the MCO 101 continually detects capacity of the base stations 106-1-106-N operating within its zone indicated by the dashed line (where the reference "N" is merely intended to indicate an integer greater than "1" and not necessarily equal to any other "N" reference herein). The local scheduler 155 of the MCO 101 then detects a capacity issue with the base station 106-1 and forms capacity requests for the MCO 102 and the MCO 103.

The MCOs 102 and 103, via their local schedulers 155, may also continually detect capacity issues with their base stations 106. Accordingly, when the local scheduler 155 of the MCO 102 receives a request from the MCO 101, the local scheduler 155 determines if it has any capacity available to share with the MCO 101. In this embodiment, the local scheduler 155 of the MCO 102 detects that capacity is available on the base station 106-N and directs that base station to release its capacity (e.g., by only allowing a lesser number of subscribers to access the base station 106-N). The base station 106-N of the MCO 102 then releases its capacity to the local scheduler 155 of the MCO 102 such that the local scheduler 155 of the MCO 102 can grant the capacity to the local scheduler 155 of the MCO 101. Once that capacity is granted, the subscribers on the base station 106-1 can begin using that capacity (e.g., in one or more of the manners described hereinabove).

As capacity can be granted, it can also be denied. In this embodiment, the local scheduler 155 of the MCO 103 also receives a request from the local scheduler 105 of the MCO 101 for additional capacity. The local scheduler 105 of the MCO 103 determines that it has no available capacity and denies the request to the local scheduler 155 of the MCO 101. Alternatively, a denial of requested capacity may be the result of MCOs being expressly from cooperating with one another (e.g., contractually precluded).

It should be noted that the invention is not intended to be limited to any particular amount of available capacity being requested. Rather, a local scheduler 155 may be able to request capacity for any number of subscribers. For example, the local scheduler 155 of the MCO 101 may need additional capacity for a single subscriber. Accordingly, the local scheduler 155 of the MCO 101 may request capacity from each of the MCOs 102 and 103 for that subscriber. Additionally, capacity requests may be based on prioritization. For example, a priority subscriber, such as an emergency response person, may be a subscriber to only one MCO 101. However, to ensure that the priority subscriber has access to communications as needed, the user equipment of the priority subscriber may be operable to direct the local schedulers 155 to coordinate to ensure that the priority subscriber has wireless access as desired.

It should also be noted that the invention is not intended to be limited to capacity requests being made only for subscribers of individual MCOs. For example, FIG. 5 illustrates another wireless provider 150 being communicatively coupled to the MCO 101. In this embodiment, the wireless provider 150 provides wireless services to a separate set of wireless subscribers. However, in certain geographical regions, that wireless provider 150 may use (e.g., lease) capacity from the MCO 101. Accordingly, the local scheduler 155 may be operable to request additional capacity for subscribers of the wireless provider 150 communicating within the operating zone of the MCO 101.

The capacity requests can be implemented in a variety of ways as a matter of design choice. For example, the local schedulers 155 of the MCOs 101-103 may be linked through an Internet connection with software that communicates between the MCOs to negotiate and share capacity. In this regard, one or more the MCOs 101-103 may have cellular transceivers configured with their respective base stations 106 so as to communicate directly through the Internet. Examples of such include LTE transceivers, such as eNodeB. In other embodiments, the local schedulers 105 of the MCOs 101-103 may communicate through a common communication link and common communication protocol to negotiate capacity sharing. This communications link may be carried over wireless channels between the separate wireless systems. Accordingly, the invention is not intended be limited to any manner in which the MCOs 101-103 negotiate and share capacity. An example of one embodiment of a communication link between the local schedulers 155 is illustrated FIG. 6.

In FIG. 6, the local schedulers 125 of the MCOs 101 and 102 communicate with one another through a communication link 161 to share capacity with one another, including backhaul capacity described above. For example, when the local scheduler 105 of the MCO 101 requests capacity from the local scheduler 105 of the MCO 102, the local scheduler 155 of the MCO 102 may grant the capacity through the communication link. Such may also entail allowing the subscriber of the MCO 101 to communicate on the base stations 106 of the MCO 102 (via data and/or voice) and then transfer that communication to the MCO 101 over the communication link such that the back office systems of the MCO 101 can associate the billing and other information with the subscriber.

Also, cellular data sessions or telephony generally require timing signals to coordinate communications and communication handoffs among base stations 106. Thus, when one subscriber is operating under the shared capacity of another MCO, timing information to manage the communications may be passed over the communication link 161 between the local schedulers 155 of the MCOs 101 and 102. One example of the protocol used for such timing includes the IEEE 1588 timing protocol. Alternatively or additionally, the local schedulers 105 of the MCOs 101 and 102 may receive timing information from satellites 160. For example, GPS satellites transmit timing and location information for receivers below. The MCOs 101 and 102 may use this timing information to coordinate their requests, call handling, and/or capacity sharing.

Again, the communication link 161 is not intended to be limited to any particular form. For example, the communication link 161 may be an "air-to-air" interface between local schedulers 155 of the MCOs 101 and 102. Alternatively or additionally, the communication link 161 may be a landline, an Internet connection, or the like. And, this embodiment (including the use of timing via the satellites 160) may be combined with other embodiments disclosed herein.

In FIG. 7, an exemplary master scheduler 175 is operable to coordinate the capacity requests with local schedulers 155 of MCOs 101-103. The master scheduler 175 is communicatively coupled to each of the MCOs 101-103 to coordinate the capacity sharing requests via their respective local schedulers 155. In this regard, the local schedulers 155 of the MCOs 101-103 are operable to detect the capacity of their respective base stations 106 to determine if and when additional capacity should be requested.

To again illustrate with the MCO 101, the local scheduler 155 of the MCO 101 detects a capacity issue with one of its base stations, the base station 106-1. Accordingly, the local scheduler 155 formats a request for additional capacity and transfers the request to the master scheduler 175. The master scheduler 175 then conveys the request for capacity to the local schedulers 155 of the MCOs 102 and 103. Such may be done in the event that the MCOs operate under unique communications protocols that may be incompatible with one another.

The local schedulers 155 of the MCOs 102 and 103, as they are continually detecting the capacity of the respective base stations 106, then make a determination if they have any available capacity to share. In this embodiment, the local scheduler 155 of the MCO 102 determines that capacity is available from one of its base stations 106-1. The local scheduler 155 of the MCO 102 then directs the base station 106-1 to release its capacity (e.g., limit the number of subscribers accessing the base station 106-1). The local scheduler 155 of the MCO 102 then indicates to the master scheduler 175 that the capacity has been released.

Once the capacity has been released to the master scheduler 175, the master scheduler 175 indicates such to the local scheduler 155 of the MCO 101 such that the MCO 101 may direct its subscribers to begin using the added capacity. The local scheduler 155 of the MCO 101, in this regard, maintains control of the requesting capacity until it is no longer needed by the base station 106-1. Once that capacity is no longer needed, the base station 106-1 releases the capacity such that the local scheduler 155 of the MCO 101 can indicate such to the master scheduler 175. The local scheduler 155 of the MCO 102, when notified by the master scheduler 175, then reacquires the capacity for base station 106-1.

Again, just as the capacity can be released and shared, it can also be denied. In this regard, the master scheduler 175 issues a capacity request to the local scheduler 155 of the MCO 103. The local scheduler 155 of the MCO 103 determines that it has no capacity available and denies the request to the master scheduler 175.

FIG. 8 illustrates another exemplary master scheduler 175 that is operable to detect capacity issues among MCOs 101-103 and request capacity on their behalf. In this embodiment, the master scheduler 175 is operable to detect capacity issues on behalf of the MCOs 101-103, thereby essentially eliminating the need for the local schedulers 155 to manage capacity. In other words, the master scheduler 175 in this embodiment offloads the local scheduler duties of the MCOs 101-103.

As the master scheduler 175 is operable to detect capacities of the base stations 106-1-106-N of each of the MCOs 101-103, the master scheduler 175 is operable to determine when a base station 106 can use more capacity. Again using the base station 106-1 of the MCO 101, the master scheduler 175 determines a capacity issue with the base station 106-1 and issues a capacity requests to the base stations with available capacity. To illustrate, the master scheduler 175 requests capacity from the base station 106-N of the MCO 102 and from the base station 106-1 of the MCO 103.

As the master scheduler 175 makes a determination whether capacity is available or not, there is no need for a base station 106 or, for that matter, an MCO to deny a capacity request. In other words, the master scheduler 175 detects and manages the capacities of the base stations 106 on behalf of the MCOs 101-103. Accordingly, when the master scheduler 175 issues the capacity request to the base station 106-N of the MCO 102 and to the base station 106-1 of the MCO 103, that capacity is released to the master scheduler 175. The master scheduler 175, in turn, grants the capacity to the base station 106-1 of the MCO 101 such that the MCO 101 can direct its subscribers to use the acquired capacity. When the capacity is no longer needed, the base station 106-1 releases the capacity to the master scheduler 175 which, in turn, returns the capacity to the base station 106-N of the MCO 102 and to the base station 106-1 of the MCO 103.

FIGS. 9-23 illustrate exemplary signaling techniques in which capacity among MCOs can be shared, be it through FDMA, CDMA, TDMA, OFDM, packet switching, or the like. Cellular communication systems generally transmit in both directions simultaneously (i.e., duplex communications), be it data or voice. Thus, it is also generally necessary to be able to specify the different directions of transmission in the signaling. The uplink side (UL) of the duplex communications includes transmissions from the user equipment to the eNodeB or base station 106. And, the downlink side (DL) of the duplex communications includes transmissions from the eNodeB or base station 106 to the user equipment. As used herein, eNodeBs are any systems, devices, software, or combinations thereof operable to communicate with user equipment via base stations 106.

The following FIGS. 9-23 illustrate the UL and DL sides of signal transmissions with the frequency domain being represented vertically and the time domain being represented horizontally, in accordance with exemplary embodiments of the invention. More specifically, FIGS. 9-13 illustrate various exemplary Time Division Duplex (TDD) LTE signaling techniques, FIGS. 14-18 illustrate various exemplary Frequency Division Duplex (FDD) LTE signaling techniques, and FIGS. 19-23 illustrate various exemplary shared eNodeB LTE signaling techniques, each of which may be implemented, either alone or in combination, with the capacity sharing embodiments described above. And, in the following embodiments of the FIGS. 9-23, certain elements have the same or similar meanings. For example, the element 301 throughout the drawings indicates a Physical Downlink Control Channel (PDCCH) whereas the element 302 indicates a Downlink Shared Channel (DL-SCH). The PDCCH 301 carries downlink allocation information and uplink allocation grants for a terminal. And, the DL-SCH 302 carries synchronization signals PSS and SSS for the user equipment to discover an LTE cell.

In LTE, the DL-SCH elements 302 are generally configured at the center of the channel and a Master Information Block (MIB) is transmitted therefrom. For example, in order to communicate with a network, the user equipment obtains basic system information, which is carried by the MIB (static) and a System Information Block (dynamic; "SIB"). The MIB carries the system information including system bandwidth, System Frame Number (SFN), and a Physical Hybrid Automatic Repeat Request (PHARM) Indicator Channel Configuration, or PHICH.

The MIB is carried on a Broadcast Channel (BCH) and mapped into a Physical Broadcast Channel (PBCH), which is transmitted with a fixed coding and modulation scheme that can be decoded after an initial cell search procedure. With the information obtained from the MIB, user equipment can decode a Control Format Indicator (CFI), which indicates the PDCCH length and allows the PDCCH 301 to be decoded. The presence in the PDCCH 301 of a Downlink Control Information (DCI) message scrambled with System Information Radio Network Temporary Identifier (SI-RNTI) indicates that an SIB is carried in the same subframe.

The SIB is transmitted in the Broadcast Control Channel (BCCH) logical channel and BCCH messages are generally carried and transmitted on the DL-SCH 302. Control signaling is used to support the transmission of the DL-SCH 302. Control information for user equipment is generally contained in a DCI message transmitted through the PDCCH 301. The number of MNOs (again, "Mobile Network Operators"), the allocation percentage per MNO, and the expected variation in allocation generally determine optimal locations for the center of each DL-SCH 302, thereby limiting the probability of DL-SCH 302 relocations.

When employing TDD in an LTE network, time coordination is used between the eNodeBs in the LTE network, including coarse time coordination, fine time coordination, and synchronized time coordination. Coarse time coordination means that at least two eNodeBs share a clock with resolution greater than a clock pulse. Fine time coordination indicates that at least two eNodeBs share a clock with resolution less than the length of a cyclic prefix. Synchronized time coordination means that sample clocks are locked between the two eNodeBs. Again, these timing considerations may be implemented in a variety of ways as a matter of design choice. For example, eNodeBs may receive their clock signals from local schedulers 155, master schedulers 175, satellites 160, network clocks, or the like.

When employing FDD in an LTE network, frequency coordination is used to between the eNodeBs in the LTE network. Generally, frequency coordination and allocation is semi-static, real time, and/or dynamic. Semi-static spectrum allocation means that spectrum allocation is provisioned by MNO agreements and changes infrequently. Real-time spectrum allocation means that spectrum allocation between MNOs that can vary dynamically based on resource needs and scheduler capability (e.g., the schedulers 155 and 175). Allocations are flexible within bounds that are configured by agreement between MNOs. Dynamic scheduling means channel time allocations that are variably sized for each MNO.

Other features common throughout FIGS. 9-23 include guard times 320 that are relevant to the timing considerations just mentioned and guard bands 330 that are relevant to the frequency considerations just mentioned. Also in FIGS. 9-23 are first downlink channels represented by the references DL M1 303, second downlink channels represented by the references DL M2 304, first uplink channels represented by the references UL M1 305, and second uplink channels represented by the references UL M2 306.

Generally, in LTE DLs, two synchronization signals are transmitted in six center Resource Blocks (RBs), including a Primary Sync Signal (PSS) and a Secondary Synchronization Signal (SSS). Information about system bandwidth is contained in the MIB and is expressed as some number of kHz above or below the center frequency. When a UE initially comes online, it finds the PSS/SSS and then the MIB.

When operators (e.g., MNOs/MCOs) share spectrum, the variability of the spectrum sharing can vary dynamically based on factors of 10 milliseconds or a number of times in an LTE frame. Since PSS, SSS, MIB, and SIB s are transmitted at the center of the spectrum, dynamically varying the spectrum sharing between two operators means that these synchronization and system messages are frequently re-aligned. Accordingly, with the embodiments disclosed herein, the center frequency block of each of the operators can be changed on a slower changing timeline compared to the variability of the spectrum sharing. Once user equipment locks onto the LTE system, it is up to the eNodeB to allocate RBs to each user equipment. Although dynamically changing the spectrum sharing generally means changing the system bandwidth and that the synchronization and system information messages are no longer transmitted in the "true center" of the new system bandwidth, an eNodeB of a first operator can simply not allocate the portion of the RBs that no longer belong to that operator as that portion is now taken up by another operator.

This mode of operations can persist until the eNodeB deems that a change of center frequency is either necessary or convenient to do so without disrupting the user equipment attached to the LTE system. An example of such includes when system bandwidth has changed (e.g., reduced or moved) so much that it resulted in the synchronization and system information messages needing to be sent outside of the system bandwidth. Another example might include when user equipment is not actively receiving traffic on a DL or sending traffic on a UL.

A new messaging may be used to indicate the new position of the center frequency blocks to assist the user equipment in finding the new center. This message may be sent via the SIB, the MIB, and/or the PDCCH (e.g., the DL control channel). In the PDCCH, seven new bits may be defined to send the new center frequency. A 2-bit counter indicates a number of frames ahead in time when new center frequency adjustment takes place, with a "0" value of the counter indicating the current center frequency.

The amount of guard time 320 should be sufficiently long to ensure user equipment can lock onto the new center frequency. If two operators do not share eNodeBs, the eNodeBs need to communicate either OTA or via the backbone. In other words, an inter-operator X2 interface can be defined. In the case where the eNodeBs from first and second operators operate more on a master-slave basis, then one eNodeB could be configured to act as user equipment to another eNodeB, and thus be allocated resources to in turn reallocate the resources to the user equipment in its system.

With this in mind, the acquired capacity in the following embodiments can be considered as an access to spectrum that is multiplexed in time and/or frequency blocks. For example, for a first second, an MNO may receive a 10 Mhz block of bandwidth. For the next two seconds, that MNO may receive a 20 Mhz block of bandwidth, and then the MNO reverts back to the 10 MHz of bandwidth for one second. Alternatively, the MNO may receive a 10 Mhz block of bandwidth indefinitely or even receive the block periodically, one second of access followed by two seconds of no access, with the pattern repeating. FIGS. 9-23 illustrate various combinations of these concepts. And, once an MNO acquires the capacity, it can place its own TDMA, CDMA and/or OFDMA channels/signals within the capacity block allocations.

Figure 9:
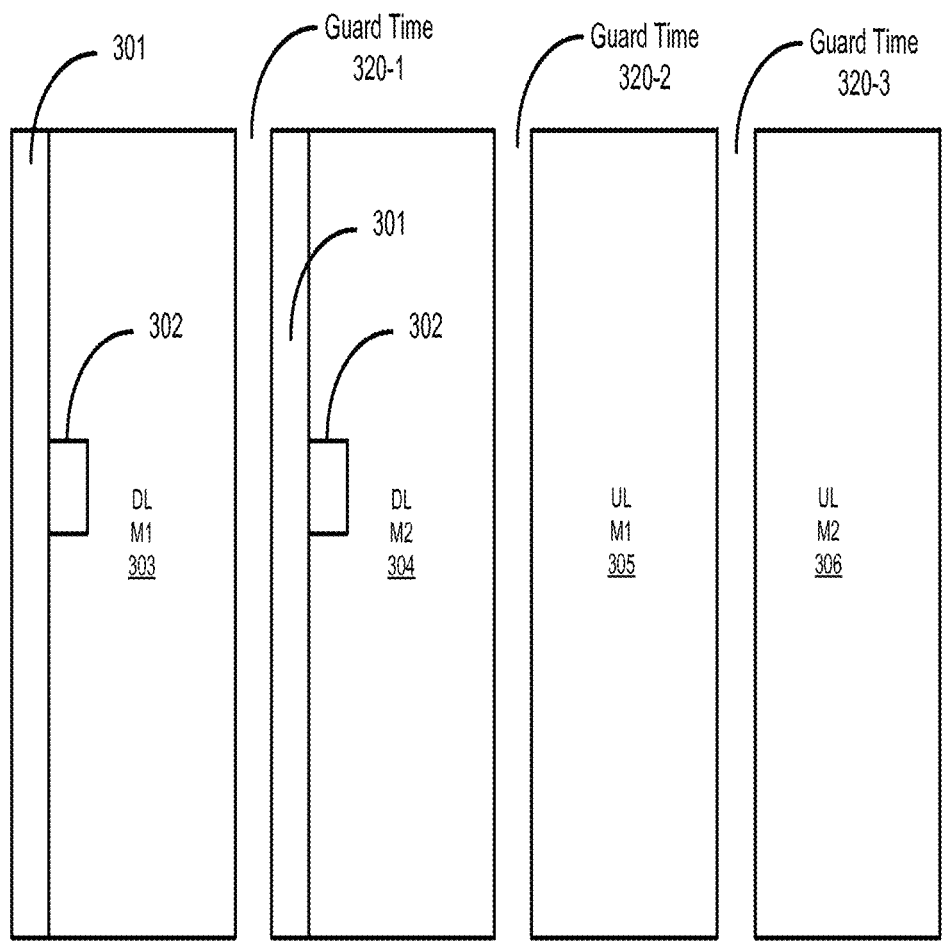
FIGS. 9-23 illustrate exemplary signaling techniques in which capacity among MCOs can be shared dynamically.

Turning now to the TDD LTE signaling techniques of FIGS. 9-13 in which capacity sharing may be employed, FIG. 9 illustrates a TDD-LTE TDM signaling with a non-shared eNodeB and static timing allocations. In this embodiment, the guard time 320-2 is generally longer than the guard times 320-1 and 320-3. The guard time 320-2 is also generally dependent on a round-trip delay of a signal between a base station 106 and user equipment.

In this embodiment, the channels DL M1 303, DL M2 304, UL M1 305, and UL M2 306 occupy the entire spectrum being allocated with the time domain allocation being static. This signaling technique employs predefined time allocations and leverages existing user equipment and eNodeBs with relatively little change in transmission. The user equipment handles two distinct PDCCHs 301 on the same band that are controlled by the MNO. The static time domain allocation may be configured manually and thus requires no new interfaces. Even though RF parameters and cell size/layout may differ for each MNO, no inter-MNO interfaces needed. And, as the guard times 320 absorb clock differences, timing synchronizations can be more loosely defined. This embodiment provides the MNOs with the ability to have multiplexed access to a single frequency bandwidth channel in a synchronized manner based on resource negotiation.

Figure 10:
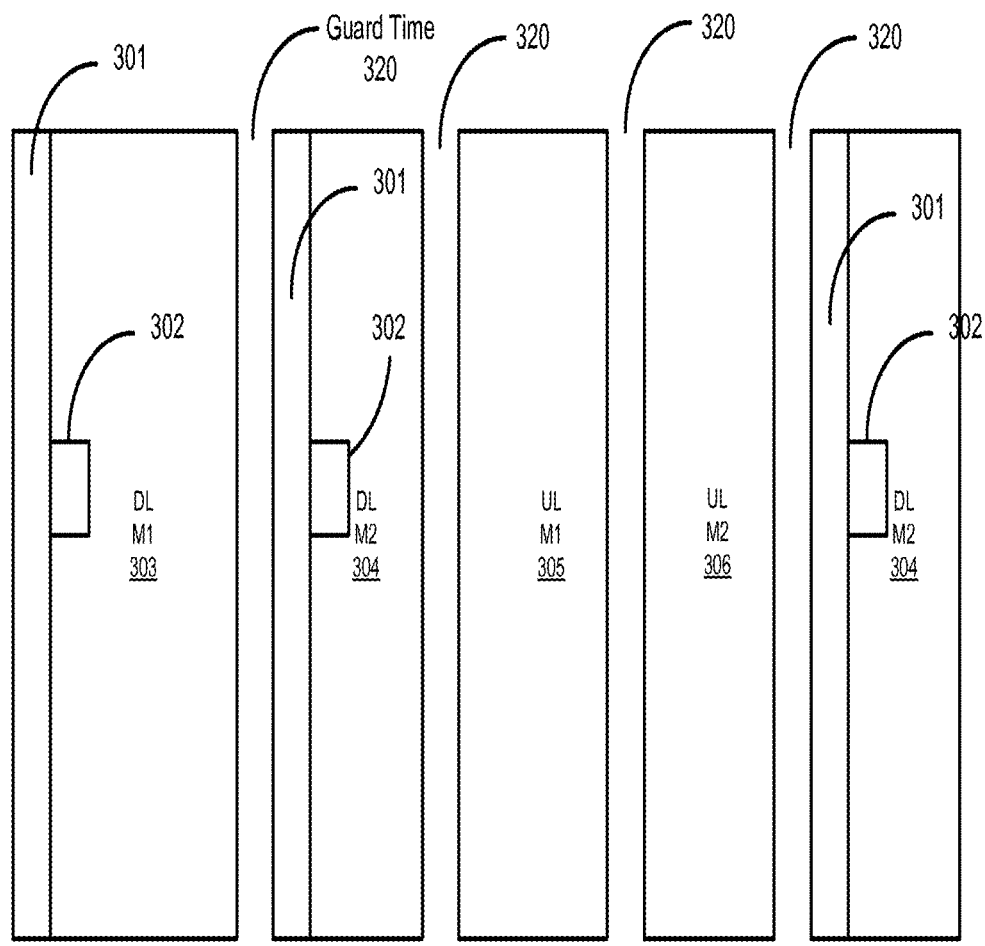

In FIG. 10, a TDD-LTE TDM signaling technique is illustrated with non-shared eNodeB and dynamic time allocation. The channels DL M1 303, DL M2 304, UL M1 305, and UL M2 306 in this embodiment again occupy the entire spectrum of the allocated frequency band but the time domain allocation is variable. The user equipment again handles two distinct PDCCHs 301 on the same band, which are controlled by the individual MNOs. Time allocation scheduling may be implemented with a customized inter-MNO interface. And, the guard times 320 absorb clock differences to provide for more loosely defined timing synchronizations. If WiFi is used to transmit (e.g., in the 2.4 GHz-2.5 GHz and the 5.7 GHz-5.9 GHz bands), the guard times 320 may be established via the Distributed Coordination Function (DCS) (i.e., via the DCF Interframe Space, or "DIFS" duration) of the IEEE 802.11 standards as follows: (guard time 320)≥(DIFS)≤(time required for transmission of a larger packet of data). This allows an eNodeB to sniff WiFi signals and track the NAV field to efficiently reclaim a channel after WiFi transmissions. This embodiment also provides the MNOs with the ability to employ a duty cycle of periodic multiplexed access that can be updated based on a current negotiated resource allocation negotiation across networks.

Figure 11:
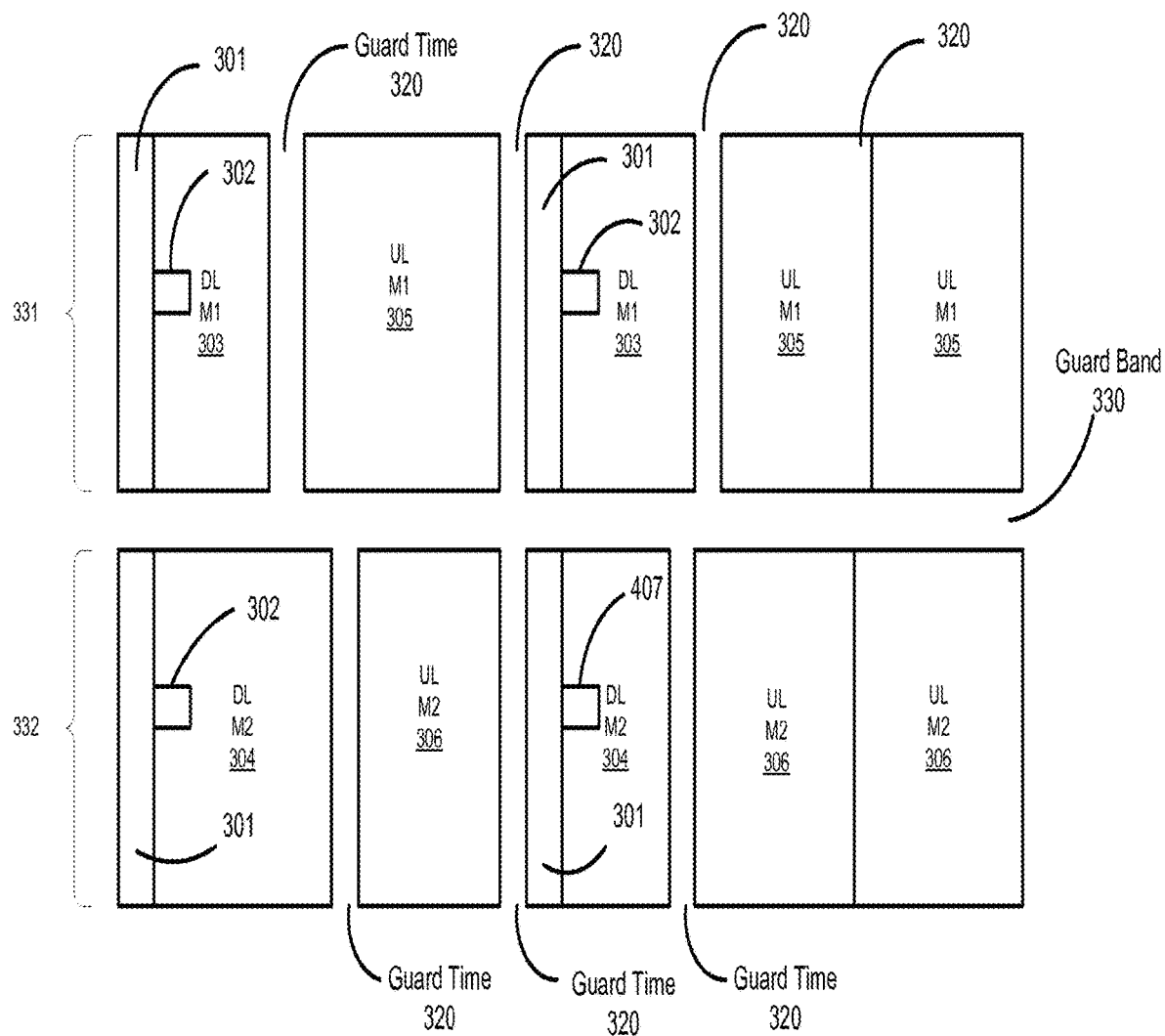

In FIG. 11, a TDD-LTE semi-static FDM signaling technique is illustrated with non-shared eNodeB. In this embodiment, the frequency spectrum is divided between two MNOs 331 and 332 in a static configuration (e.g., MNO 331 and MNO 332 being analogous to MCO 101 and MCO 102). Each of the MNOs 331 and 332 operate their sub-bands independently with respect to their RF parameters and scheduling/resource allocation within its respective sub-band. Generally this means that the M1 and M2 channels negotiate to adjust frequency spectrum splits. In this regard, the splits are separated by frequency guard bands 330 such that the spectrum splits can be more loosely defined.

Figure 12:
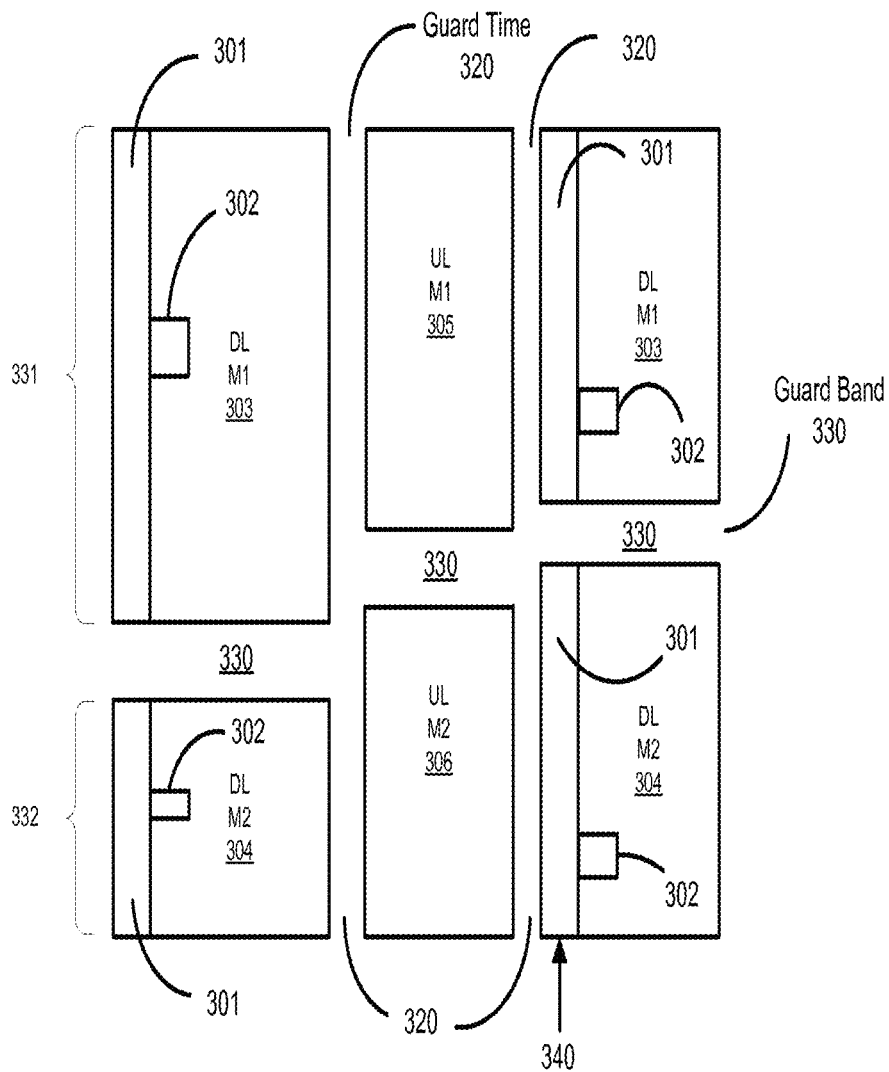

In FIG. 12, a TDD-LTE semi-static time-coordinated FDM signaling technique is illustrated with non-shared eNodeB. Generally, time coordinated means that, at any instant in time, both the M1 and M2 channels are either UL or DL, and thus does not ensure orthogonality. Accordingly, eNodeBs are synchronized to ensure orthogonality. The frequency spectrum split of the M1 and M2 channels is semi-static but does not match for the UL and DL. The arrow 340 indicates that there is no shift of the PSS and SSS signals is needed if its current location remains within the MNO allocation. This embodiment is similar to that shown in FIG. 11, in that it generally employs time coordination so that the UL and DL can operate in the same time windows. This time coordination may require inter-MNO interfaces for the MNOs 331 and 332. And, since this does not require time or frequency synchronization, this signaling technique allows for the more loosely defined guard times 320 and guard bands 330. This embodiment provides the MNOs with periodic multiplexed access to a frequency bandwidth channel via both duty cycle and channel bandwidth that can be updated based on a current negotiated resource allocation across networks.

Figure 13:
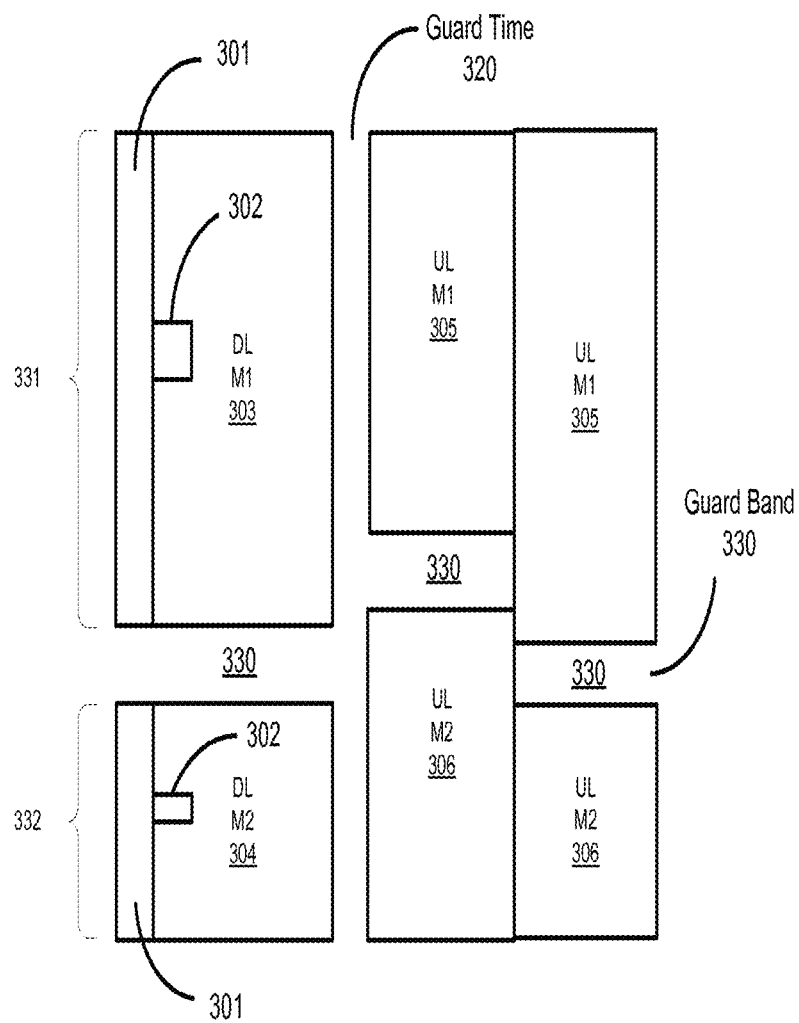

In FIG. 13, a TDD-LTE real-time time-coordinated FDM signaling technique with non-shared eNodeB. In this embodiment, the spectrum split between M1 and M2 is real-time variable without matching for UL and DL. This generally means that coordinated scheduling is employed (e.g., via the master scheduler 175 or via coordinated local schedulers 155). An inter-MNO interface may be configured, in this regard, to coordinate with the schedulers and create real time spectrum allocation.

Figure 14:
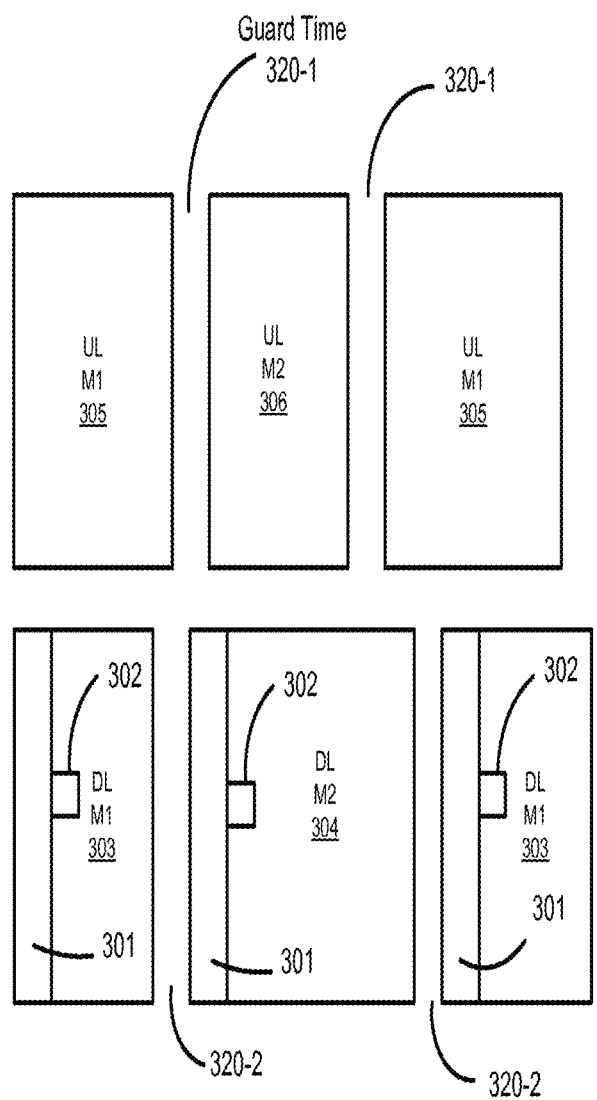

Turning now to FIGS. 14-18, various exemplary FDD-LTE signaling techniques are illustrated. In FIG. 14, an FDD-LTE TDM signaling technique is illustrated with Non-Shared eNodeB and a static scheduling. The guard times 320-1 in this embodiment are not necessarily equal to the guard times 320-2. And, as this is a static scheduling configuration, channel time allocations are generally consistent for each MNO. Frequency allocation is also static for the UL and DL PDCCHs 301 are unique for each MNO and generated by each eNodeB independently. RF parameters and cell size/layout may be different for each MNO thereby leveraging existing user equipment and eNodeB with fewer changes. The user equipment, however, generally needs to handle two distinct PDCCHs 301 on the same band.

Figure 15:
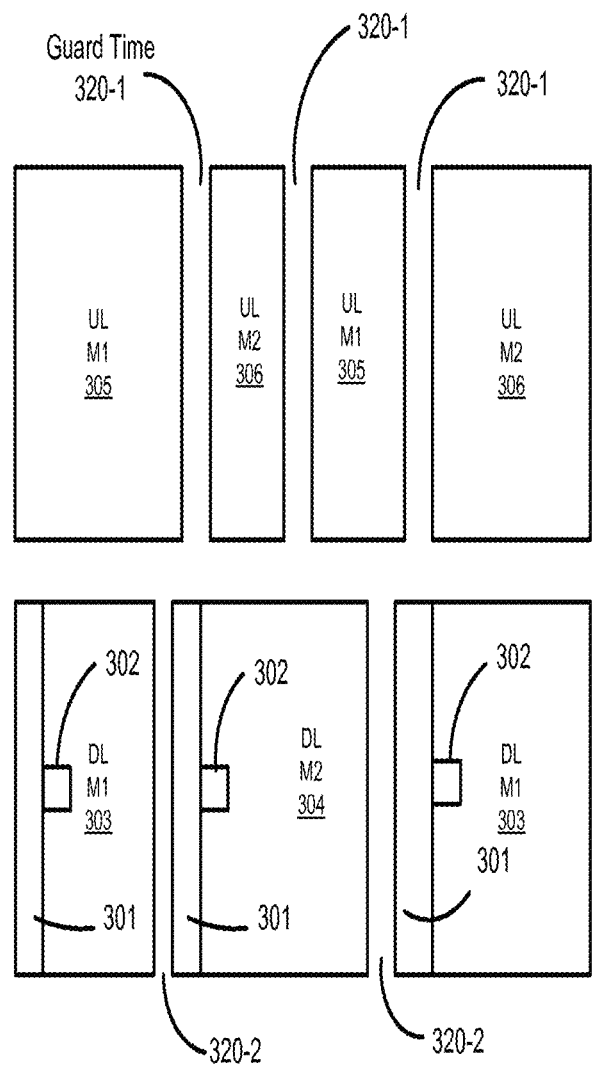

In FIG. 15, an FDD-LTE TDM signaling technique with non-shared eNodeB and dynamic time allocation is illustrated. In this embodiment, the guard times 320-1 are again not necessarily equal to the guard times 320-2. Scheduling is non-static meaning that channel time allocations may be variably sized for each MNO and that it may be external or hierarchical. However, frequency allocation is static for the UL and DL. PDCCHs 301 are unique for each MNO and are generated by each eNodeB independently. RF parameters and cell size/layout may also differ for each operator. User equipment generally needs to handle two distinct PDCCHS 301 on same band.

Figure 16:
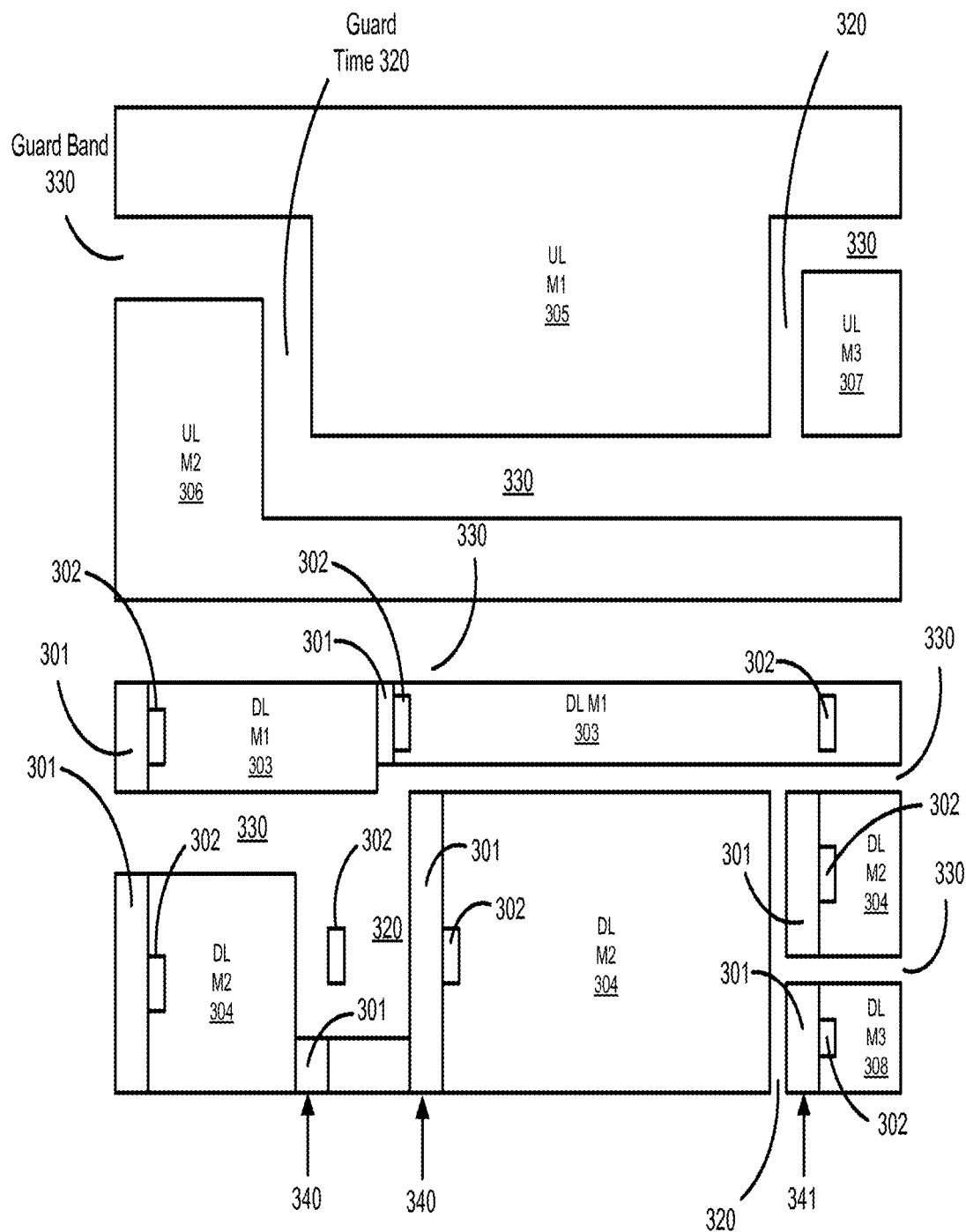

In FIG. 16, an FDD-LTE Dynamic FDM signaling technique with non-shared eNodeB is illustrated. In this embodiment, a PDCCH 301 is sent for center frequency adjustment to dynamically allocate resources. A master resource allocator (e.g., the master scheduler 175) may assign center frequencies to each MNO based on estimated traffic. Adjustment to center frequencies may be done through the PDCCH 301.

A control channel is maintained in the middle to provide agile resource allocation. In this regard, the PDCCH 301 may require additional bits to assign the new center frequency. A 2-bit counter may be used to indicate a number of frames ahead in time when the new center frequency adjustment is assigned. A "0" value in the counter indicates the current center frequency. Alternatively, the MIB may be used to assign the center frequency.

Frequency allocation is dynamic for the UL and the DL. The PDCCHs 301 are unique for each MNO and generated by each eNodeB independently. Again, the RF parameters and cell size/layout may be different for each MNO. The arrow 340 indicates that there is no shift of the PSS and SSS signals is needed if its current location remains within the MNO allocation. However, the arrow 341 indicates that adjustment of resources may occur with the PDCCH 301 (e.g., a differential control channel frequency).

Figure 17:
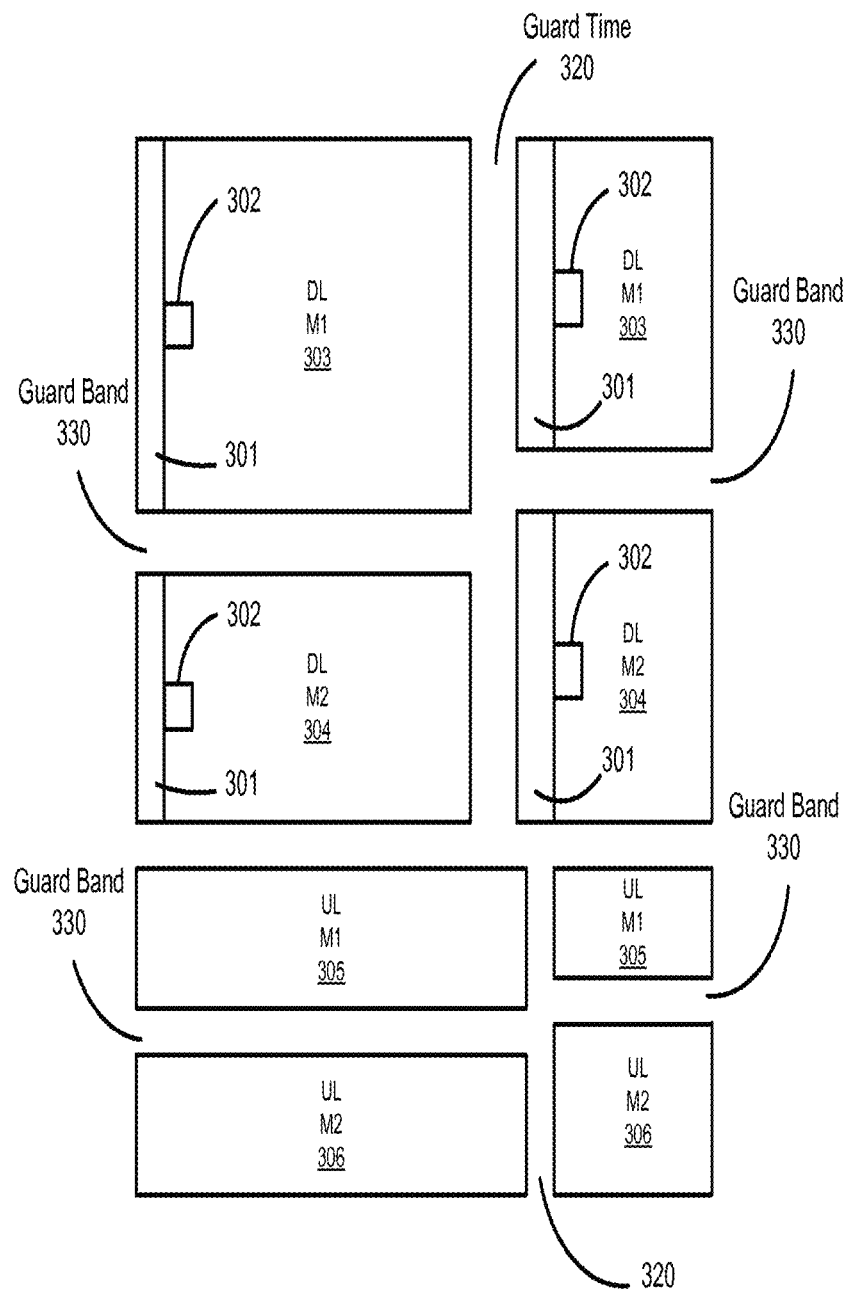

In FIG. 17, an FDD-LTE TDM semi-static time coordination with non-shared eNodeB employing dynamic time allocation is illustrated. In this embodiment, time coordination generally means that M1 and M2 change frequency spectrum allocation in unison. The spectrum split between M1 and M2 is semi-static, but there is no matching for the UL and the DL, similar to the embodiment illustrated in FIG. 16. This signaling technique does not require time coordination for changing spectrum allocation between the UL and the DL. However, an inter-MNO interface may be required for time coordination of frequency spectrum allocation between MNOs. Also, changes in spectrum allocation may cause a spectrum overlap. Accordingly, guard times 320 and guard bands 330 may be used.

Figure 18:
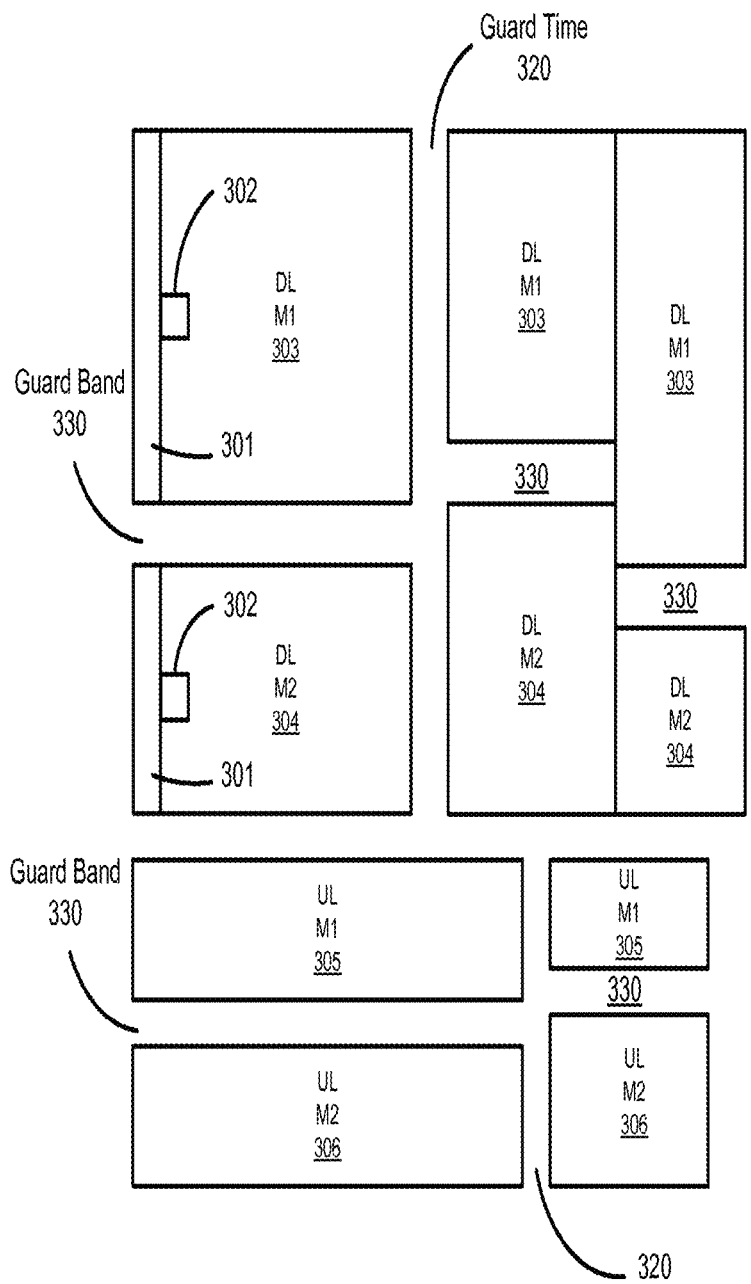

In FIG. 18, an FDD-LTE TDM real-time time coordination FDM signaling technique is illustrated with non-shared eNodeB. In this embodiment, a spectrum split/allocation between M1 and M2 is real-time variable, but has no matching for the UL and the DL. Such may employ coordinated scheduling (e.g., via the master scheduler 175 or via coordinated local schedulers 155), an inter-MNO interface, as well as an interface to an arbiter (e.g., the master scheduler 175).

Figure 19:
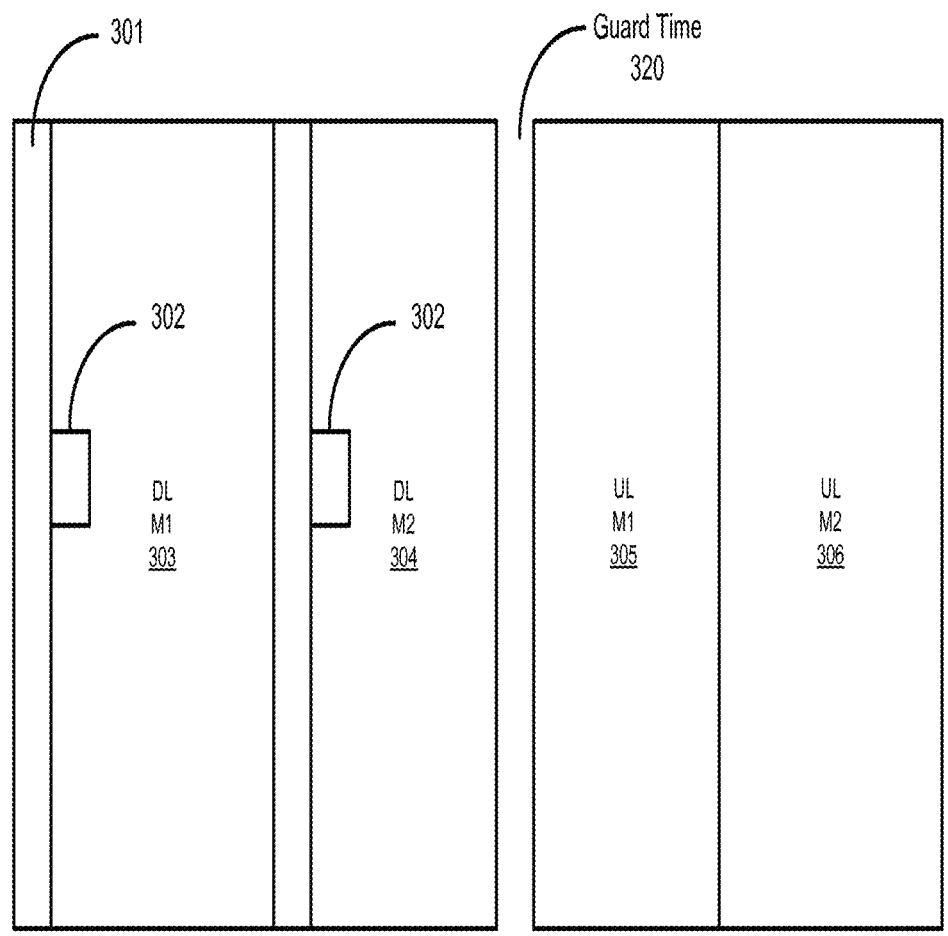

Turning now to FIGS. 19-23, various exemplary shared eNodeB signaling techniques are illustrated. In FIG. 19, a TDD-LTE TDM signaling technique with Shared eNodeB is illustrated.

Figure 20:
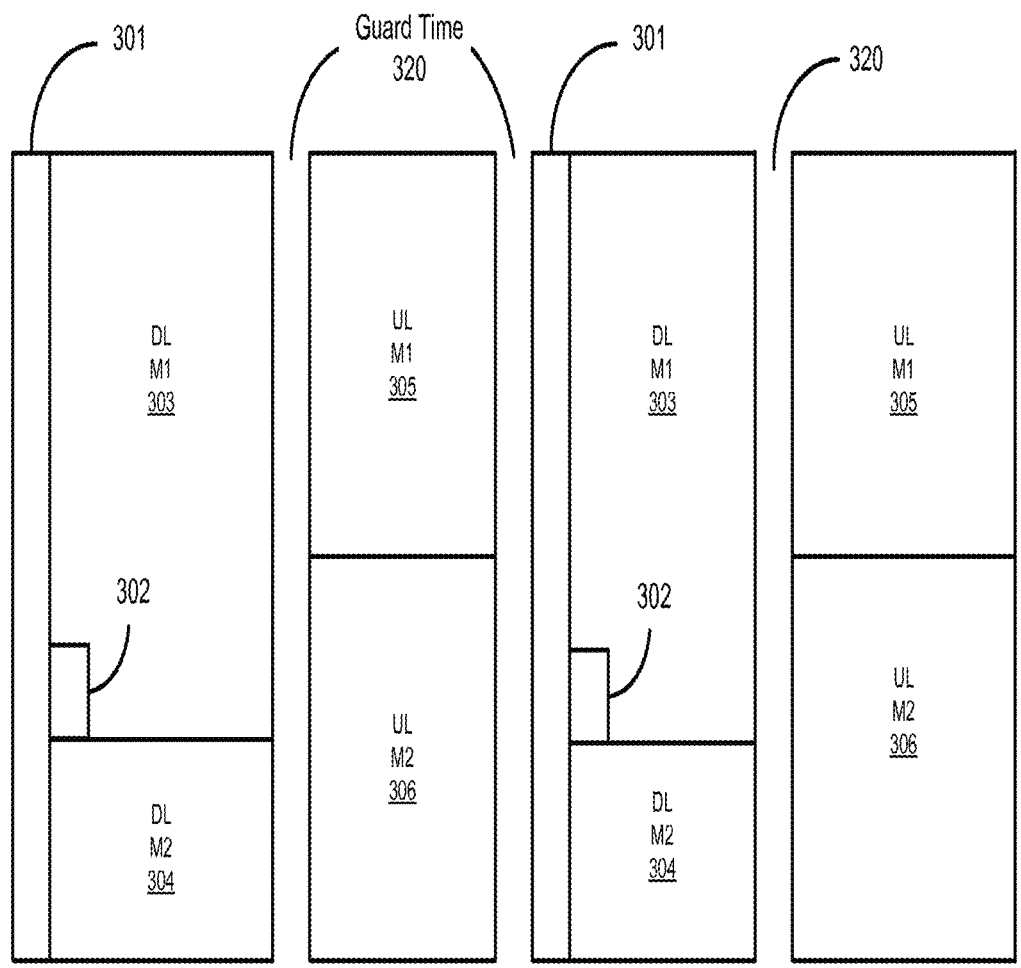

In FIG. 20, a TDD-LTE semi-static time-coordinated FDM signaling technique with shared eNodeB and dual S1 with multiplexed PDCCH 301 is illustrated.

Figure 21:
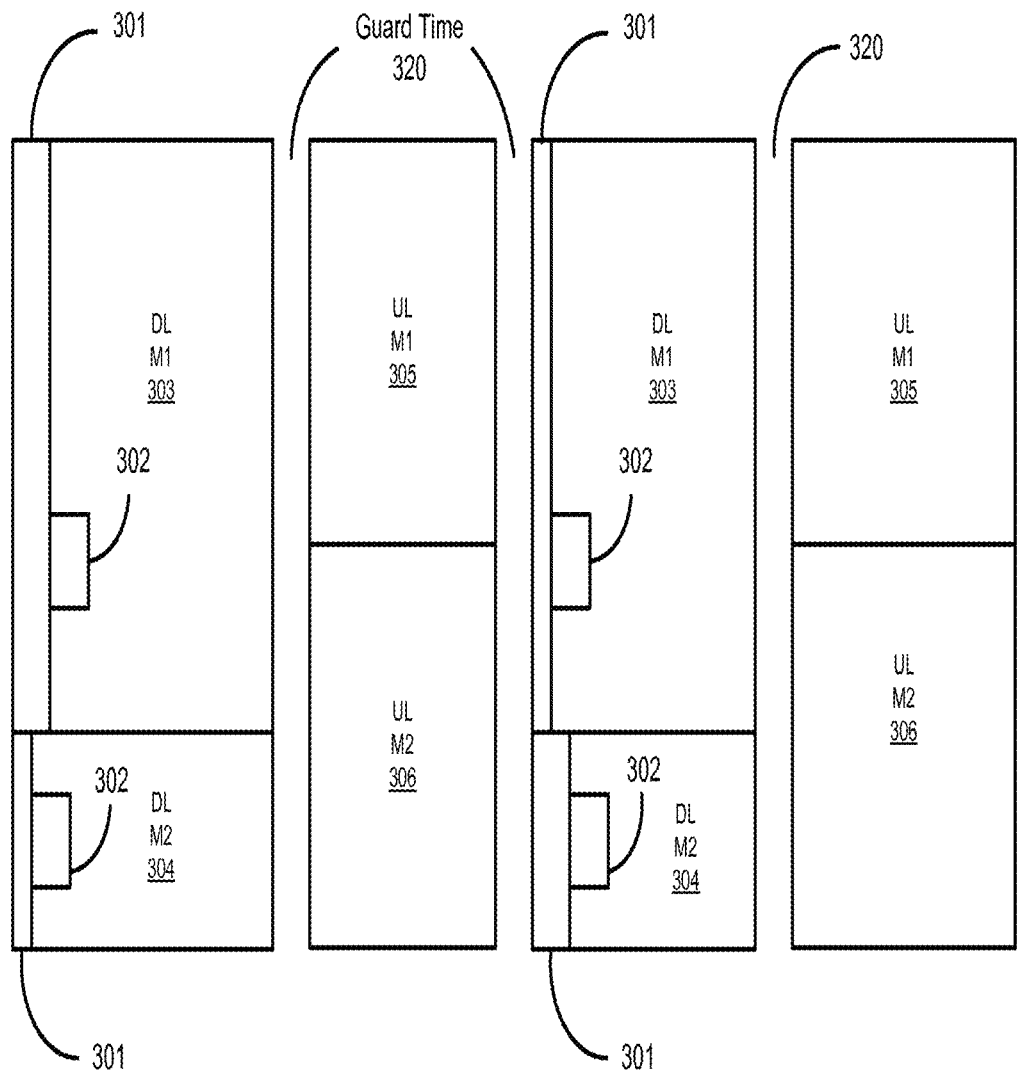

In FIG. 21, a TDD-LTE semi-static time-coordinated FDM signaling technique with shared eNodeB and dual S1 with dual PDCCH 301 is illustrated.

Figure 22:
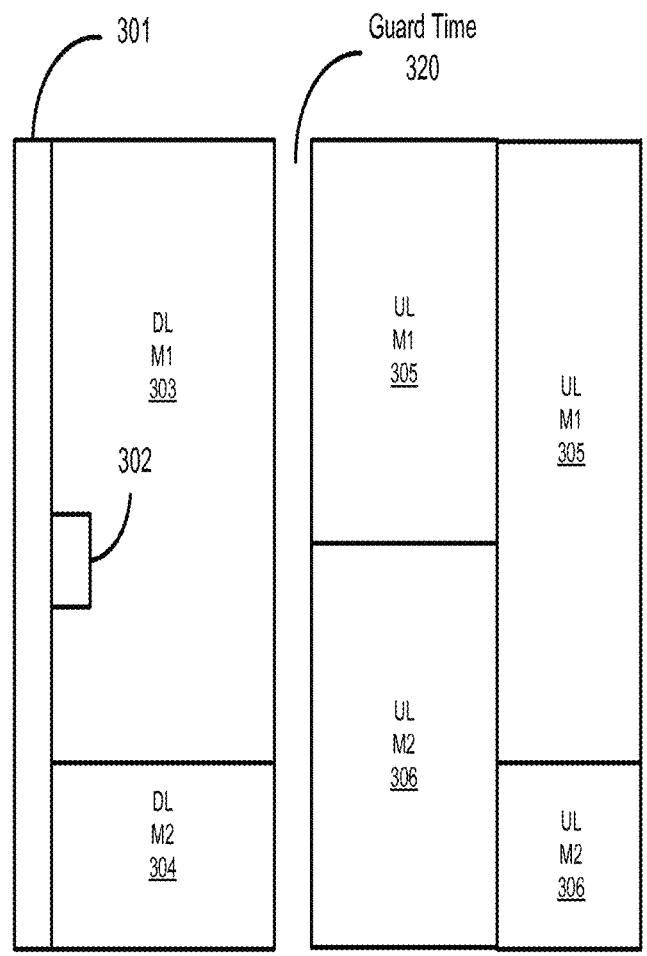

In FIG. 22, a TDD-LTE dynamic FDM signaling technique with shared eNodeB is illustrated. In this embodiment, one eNodeB is shared by "N" number of MNOs. This signaling technique employs continuous Orthogonal Frequency Division Multiplexing (OFDM) without guard bands 330 on the DL and the UL. It also employs a common PDCCH 301 and each MNO resource allocation is in real-time.

Figure 23:
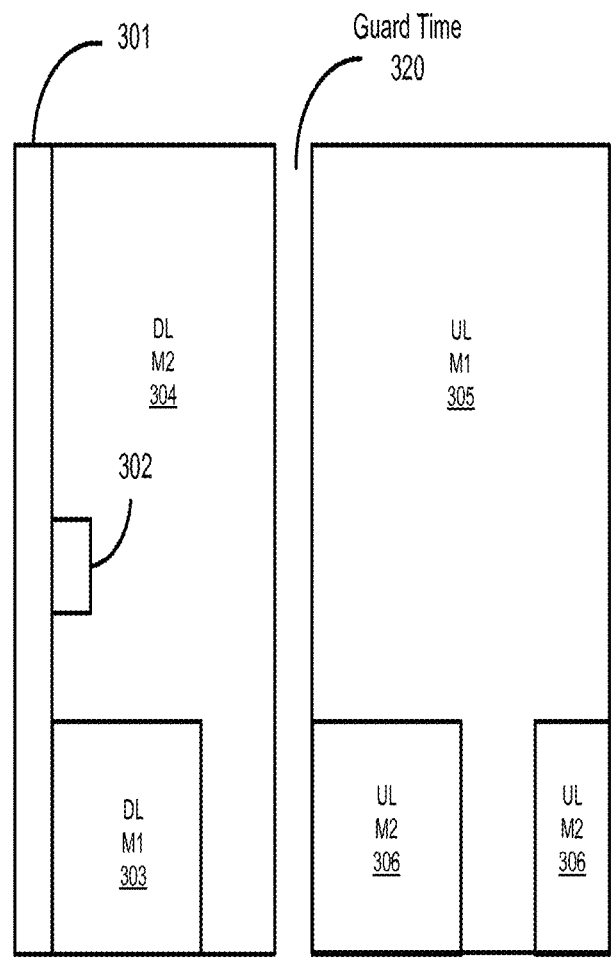

In FIG. 23, a TDD-LTE TDM signaling technique with shared eNodeB is illustrated. This embodiment employs dynamic time and frequency allocation. Generally, resources are synchronized and dynamically allocated between MNOs. A guard time 320 is implemented for the DL and the UL transitions (e.g., based on RTT of the user equipment).

Also, there are generally two scheduling models. A first model includes a common scheduler, such as the master scheduler 175, to coordinate sharing between MNOs for resource and user equipment allocation. A second model includes hierarchical scheduling where resources are divided amongst MNOs via the master scheduler 175 on a shared eNodeB. The user equipment may perform scheduling on the UL within allocated resources via "child schedulers" on the shared eNodeB.

The embodiments herein provide new cellular broadcast channels that can be used to communicate spectrum use to cellular peers while providing collision avoidance techniques to broadcast channels such that cellular peers can dynamically enter and leave shared signaling. The cellular broadcast channel leverages existing cellular broadcast channel synchronization methods specific to the cellular air interface (e.g., LTE). The broadcast channel indicates that it is a spectrum use broadcast channel and includes a mobile network code and indicates the spectrum bands in use.

Each sequence of information pertaining to spectrum band in use generally indicates the spectrum band in use, the subcarriers in use within the band, and the time period of expected use for the subcarrier prior to release to another network. The cellular broadcast channel is generally used on a well-known narrow band frequency, such as WiFi. The cellular network senses the frequency to ensure it is not being used prior to broadcasting its spectrum use on that frequency. This avoids collisions between cellular broadcast channels. Other networks can also scan the frequency to determine if the spectrum is in use.

The embodiments disclosed herein can also extend existing cellular broadcast channels for cellular peers to communicate spectrum use to each other. For example, as an alternative to the cellular broadcast channel, the cellular network may use an extended cellular broadcast channel to communicate its spectrum use. In this case, spectrum use information may be appended to the end of an existing broadcast channel. This broadcast channel indicates a spectrum use broadcast channel, a mobile network code, and the spectrum bands that are in use. Similarly, each sequence of spectrum band in use information indicates the spectrum band in use, the subcarriers in use within the band, and the time period of expected use for the subcarrier prior to release to another network. Another network may still need to scan the band to find the broadcast channel as sense and collision avoidance techniques may not be used in such an embodiment.

The embodiments disclosed herein also allow base stations 106 to broadcast their spectrum use as WiFi traffic payloads or via MAC layer signaling. In this regard, each base station 106 would contain a WiFi transceiver for the sake of spectrum use communications. A WiFi SSID is then broadcast to indicate spectrum use of the cellular network. The SSID name may indicate it is being used for spectrum information. Alternatively, the 802.11 MAC layer broadcast messaging would indicate a spectrum information SSID. And, a WiFi device would be able to detect the spectrum information SSID to "auto-associate". Once associated, the base station 106 broadcasts spectrum use information as an application or in the form of a MAC layer information response.

User equipment can also be configured to detect broadcast channels via cellular scanning and broadcast channel interpretation. The user equipment can also be configured to detect the broadcast channels over a WiFi traffic channel broadcasts (e.g., via cellular spectrum use broadcast information as WiFi MAC signaling or traffic payloads). The user equipment can also be configured to detect broadcast channels over WiFi by extending the HS2.0 3GPP network information beacon. For example, 802.11u (part of 802.11-2012) includes a MAC layer information exchange of 3GPP information. The MAC layer includes a mobile network identifier and an authentication mechanism identifier used in network attachment. This information can be extended to include spectrum-in-use information.

Additionally, WiFi channel detection can be integrated into the base stations 106 so that a base station 106 can dynamically assign frequencies. For example, an LTE base station can be configured to detect WiFi beacons that describe beacon use. In this regard, WiFi radio interfaces can be integrated into the LTE base stations to operate as a WiFi device. The base station 106 would then scan and detect SSIDs to see the spectrum is in use by WiFi. The SSIDs would indicate the bands and channels in use by the WiFi network such that subscribers could access them the other user equipment. A cellular network within avoid placing cellular subcarriers in the spectrum when it is in use by the WiFi SSIDs. Alternatively, other unlicensed band receivers could be incorporated into the base station 106 to detect energy that may not be WiFi, including Zigbee, wireless microphones, and the like. From there, the base station 106 could dynamically assign frequencies to its subscribers.

In one LTE embodiment, UE measurements related to inter-system (a.k.a. inter-RAT) mobility and/or Inter-frequency automatic neighbor relation (ANR) can be extended to dynamically include a WiFi cell as a neighbor. The ANR is a cellular technique where neighboring cells are automatically discovered. Such an embodiment would support mobility across networks. For example, during WiFi network discovery, the cellular network can populate WiFi neighbor information in the ANR for the sake of handover planning between WiFi and cellular. This is not a spectrum sharing topic, but rather a mobility technique that exploits network detection techniques that can also be used for spectrum sharing.

Wireless access points of WiFi networks can be configured to detect new cellular broadcast channels and/or extended cellular broadcast channels and then apply 802.11 dynamic frequency selection (DSF) and channel selection principals to avoid collision with cellular use of the spectrum. Once the WiFi networks detect the spectrum in use by cellular networks, the WiFi networks can assign associated WiFi devices to channels in the band that will not interfere with the cellular network where they can assign channels to another band not in use by the cellular network. Enrollee stations (STAs) of Wi-Fi networks can also be configured to detect new cellular broadcast channels and/or extended cellular broadcast channels to avoid cellular spectrums in use. Such solves interference issues with WiFi peer to peer transmissions.

Base stations 106 can also be configured to detect WiFi beacons and control messages in order to avoid currently in use WiFi channels. For example, the base stations 106 can take into account the frequencies currently in use by cell network peers (e.g., different MCOs/MNOs) and WiFi end points as part of their traffic channel assignment decisions. For example, the base stations 106 can detect new broadcast channels or extended broadcast channels and then avoid using subcarriers or bands indicated in the broadcast channels for transmission to devices on their network. This prevents interference between cellular networks.

Additionally, WiFi STAs and access points can take into account the frequencies currently in use by cell network peers as part of their band and traffic channel assignment decisions. For example, WiFi devices (e.g., user equipment) and access points can detect the spectrum in use by the cellular network via a broadcast SSID. WiFi access points then avoid using the frequencies of cellular bands and subcarriers based on WiFi SSIDs and associated devices.

The embodiments disclosed herein provide many advantages over the prior art including dynamic coexistence of multiple cellular networks through scheduled coordination and/or collision avoidance. For example, in some embodiments, a WiFi receiver is incorporated into a base station 106 for frequency use detection as well as broadcasting to avoid signaling collisions. Alternatively or additionally, an LTE receiver can be configured in your WiFi access point for frequency use detection and broadcasting. Some embodiments also include dynamic mapping and interleaving of LTE and WiFi carriers and subcarriers. Other embodiments provide for WiFi dissociation for spectrum reallocation to new frequencies and/or the use of LTE forced network de-registrations for spectrum reallocation to new frequencies. And, the stations 106 can take into account the frequencies currently in use by cell network peers and WiFi end points as part of their traffic channel assignment decisions. WiFi STAs and access points can also take into account the frequencies currently in use by cell network peers as part of their band and traffic channel assignment decisions.

Figure 24:
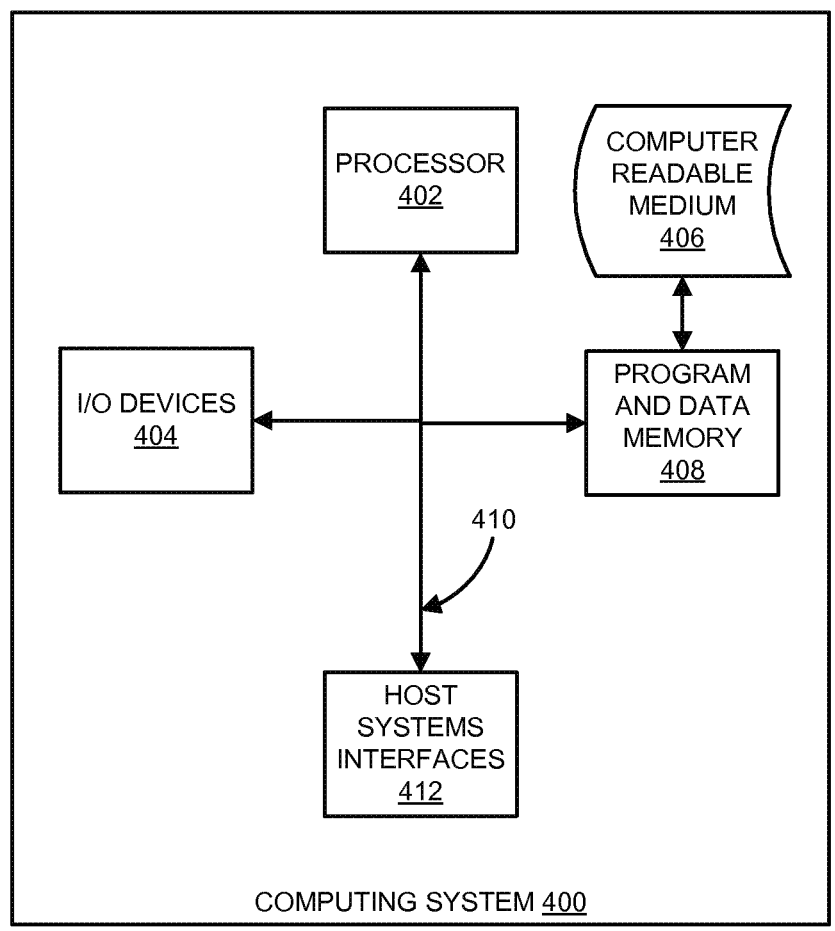
FIG. 24 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 24 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A telecommunications timing system, comprising:
a synchronizable network timing clock for distributing timing within a first network at least partially for providing timing for capacity requests between different wireless communication systems, each wireless communication system including a plurality of wireless base stations;
a timing receiver for receiving a timing signal from a remote timing source; and
a synchronizer for synchronizing the synchronizable network timing clock to timing related to the received timing signal to generate a synchronized timing signal.

2. The telecommunications timing system of claim 1, further comprising a first scheduler output for conveying the synchronized timing signal to a scheduler.

3. The telecommunications timing system of claim 1, wherein the telecommunications timing system is incorporated within a first Mobile Central Office (MCO) having a first scheduler.

4. A telecommunications timing system, comprising:
a synchronizable network timing clock for distributing timing within a first network;
a timing receiver for receiving a timing signal from a remote timing source; and
a synchronizer for synchronizing the synchronizable network timing clock to timing related to the received timing signal to generate a synchronized timing signal;
wherein:
the telecommunications timing system is incorporated within a first Mobile Central Office (MCO) having a first scheduler configured to provide for capacity sharing between different wireless communication systems, each wireless communication system including a plurality of wireless base stations, and
the first MCO is in communication with a second MCO, each of the first MCO and the second MCO utilizing the remote timing source such that the first and the second MCO may communicate due to timing synchronization.

5. The telecommunications timing system of claim 4, wherein the second MCO includes the remote timing source.

6. The telecommunications timing system of claim 4, wherein the remote timing source is embodied by one or more satellites.

7. The telecommunications timing system of claim 6, wherein the one or more satellites are Global Positioning Satellites.

8. A telecommunications timing system, comprising:
a synchronizable network timing clock for distributing timing within a first network;
a timing receiver for receiving a timing signal from a remote timing source; and
a synchronizer for synchronizing the synchronizable network timing clock at least partially based on the received timing signal, to generate a synchronized timing signal;
wherein:
the telecommunications timing system is incorporated within a first communication system having a first scheduler configured to provide for capacity sharing between different communication systems, each communication system including a plurality of network nodes,
the first communication system is in communication with a second communication system, and
the second communication system is synchronized with the first communication system at least partially via the remote timing source.

9. The telecommunications timing system of claim 8, wherein the second communication system includes the remote timing source.

10. The telecommunications timing system of claim 8, wherein the remote timing source is embodied by one or more satellites.

11. The telecommunications timing system of claim 10, wherein the one or more satellites are Global Positioning Satellites.

* * * * *